US012687797B2

(12) United States Patent
Sano et al.

(10) Patent No.: US 12,687,797 B2
(45) Date of Patent: Jul. 21, 2026

(54) TONER

(71) Applicant: CANON KABUSHIKI KAISHA, Tokyo (JP)

(72) Inventors: Tomohisa Sano, Shizuoka (JP); Hiroki Kagawa, Shizuoka (JP); Tohru Hiramatsu, Shizuoka (JP); Kazuyuki Sato, Kanagawa (JP); Shohei Shibahara, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 454 days.

(21) Appl. No.: 18/305,251

(22) Filed: Apr. 21, 2023

(65) Prior Publication Data

US 2023/0350320 A1 Nov. 2, 2023

(30) Foreign Application Priority Data

Apr. 28, 2022 (JP) ................................ 2022-075104

(51) Int. Cl.
*G03G 9/097* (2006.01)
*G03G 9/08* (2006.01)

(52) U.S. Cl.
CPC ....... *G03G 9/09725* (2013.01); *G03G 9/0819* (2013.01)

(58) Field of Classification Search
CPC ......................... G03G 9/09725; G03G 9/0819
See application file for complete search history.

(56) References Cited

U.S. PATENT DOCUMENTS 5,641,601 A * 6/1997 Mitani ................. G03G 9/0833 430/903
5,686,054 A 11/1997 Barthel et al.
5,851,715 A 12/1998 Barthel et al.
(Continued)

FOREIGN PATENT DOCUMENTS

EP 2799929 A1 11/2014
EP 2853945 A1 4/2015
(Continued)

OTHER PUBLICATIONS

English machine translation of the description of JP-2016167029-A (Year: 2016).*
(Continued)

*Primary Examiner* — Mark F. Huff
*Assistant Examiner* — Boone Alexander Evans
(74) *Attorney, Agent, or Firm* — VENABLE LLP

(57) ABSTRACT

A toner includes a toner particle, and a silica fine particle on a surface of the toner particle. Fragment ions corresponding to a D unit structure are observed in a specific measurement; when the silica fine particle is dispersed in a mixed solution of ethanol and aqueous solution of NaCl, followed by a titration operation using sodium hydroxide, a titer is within a specific range; in a chemical shift obtained by a specific measurement, with D as an area of a peak having a peak top present in a range from −25 to −15 ppm, and with D1 as an area of a peak having a peak top present in a range of more than −19 ppm and −17 ppm or less, D and D1 are in a specific ratio; and a vinyl-based resin having a specific structure is present on the surface of the toner particle.

9 Claims, 1 Drawing Sheet

(56) References Cited

U.S. PATENT DOCUMENTS

| | | | | |
|---|---|---|---|---|
| 5,981,131 | A * | 11/1999 | Hirama | C09C 3/12 430/108.7 |
| 6,287,739 | B1 * | 9/2001 | Kawakami | G03G 9/0819 430/108.7 |
| 7,402,368 | B2 | 7/2008 | Ogawa | |
| 7,494,636 | B2 | 2/2009 | Ishibashi et al. | |
| 7,582,401 | B2 | 9/2009 | Ogawa et al. | |
| 7,678,523 | B2 | 3/2010 | Hiroko et al. | |
| 7,678,524 | B2 | 3/2010 | Hasegawa et al. | |
| 7,923,190 | B2 | 4/2011 | Magome et al. | |
| 8,227,162 | B2 | 7/2012 | Sano et al. | |
| 8,426,094 | B2 | 4/2013 | Magome et al. | |
| 8,614,044 | B2 | 12/2013 | Matsui et al. | |
| 8,778,585 | B2 | 7/2014 | Matsui et al. | |
| 8,841,054 | B2 | 9/2014 | Dojo et al. | |
| 9,152,065 | B2 | 10/2015 | Sano et al. | |
| 9,229,345 | B2 | 1/2016 | Ikeda et al. | |
| 9,235,151 | B2 | 1/2016 | Tanaka et al. | |
| 9,377,708 | B2 | 6/2016 | Magome et al. | |
| 9,423,708 | B2 | 8/2016 | Tominaga et al. | |
| 9,436,112 | B2 | 9/2016 | Iwasaki et al. | |
| 9,551,947 | B2 | 1/2017 | Hiroko et al. | |
| 9,665,026 | B2 | 5/2017 | Iwasaki et al. | |
| 9,785,068 | B2 | 10/2017 | Umeda et al. | |
| 9,804,514 | B2 | 10/2017 | Suzumura et al. | |
| 9,804,519 | B2 | 10/2017 | Suzumura et al. | |
| 9,829,816 | B2 | 11/2017 | Tanaka et al. | |
| 9,841,692 | B2 | 12/2017 | Hasegawa et al. | |
| 9,880,478 | B2 | 1/2018 | Shimano et al. | |
| 9,927,728 | B2 | 3/2018 | Arimura et al. | |
| 9,946,179 | B2 | 4/2018 | Arimura et al. | |
| 9,946,181 | B2 | 4/2018 | Hasegawa et al. | |
| 9,964,874 | B2 | 5/2018 | Suzumura et al. | |
| 9,964,881 | B2 | 5/2018 | Ikejiri et al. | |
| 9,971,262 | B2 | 5/2018 | Hasegawa et al. | |
| 10,012,923 | B2 | 7/2018 | Sano et al. | |
| 10,114,303 | B2 | 10/2018 | Katsura et al. | |
| 10,151,990 | B2 | 12/2018 | Suzuki et al. | |
| 10,228,627 | B2 | 3/2019 | Nagashima et al. | |
| 10,295,920 | B2 | 5/2019 | Nishikawa et al. | |
| 10,303,075 | B2 | 5/2019 | Tanaka et al. | |
| 10,310,397 | B2 | 6/2019 | Sano et al. | |
| 10,437,166 | B2 | 10/2019 | Shibata et al. | |
| 10,545,420 | B2 | 1/2020 | Kinumatsu et al. | |
| 10,564,560 | B2 | 2/2020 | Onozaki et al. | |
| 10,698,327 | B2 | 6/2020 | Nagashima et al. | |
| 10,782,623 | B2 | 9/2020 | Yoshiba | |
| 10,969,704 | B2 | 4/2021 | Kagawa et al. | |
| 11,079,695 | B2 | 8/2021 | Sato et al. | |
| 11,099,493 | B2 | 8/2021 | Komiya et al. | |
| 11,112,709 | B2 | 9/2021 | Saeki et al. | |
| 11,112,713 | B2 | 9/2021 | Akiyama et al. | |
| 11,181,844 | B2 | 11/2021 | Nagaoka et al. | |
| 11,415,902 | B2 | 8/2022 | Watanabe et al. | |
| 11,448,980 | B2 | 9/2022 | Matsui et al. | |
| 11,531,284 | B2 | 12/2022 | Iguchi et al. | |
| 11,796,930 | B2 | 10/2023 | Watanabe et al. | |
| 11,809,132 | B2 | 11/2023 | Nagashima et al. | |
| 11,835,874 | B2 | 12/2023 | Sato et al. | |
| 12,078,962 | B2 | 9/2024 | Sano et al. | |
| 12,111,614 | B2 | 10/2024 | Hiramatsu et al. | |
| 12,228,882 | B2 | 2/2025 | Ohmori et al. | |
| 12,306,579 | B2 | 5/2025 | Sato et al. | |
| 12,449,742 | B2 | 10/2025 | Yoshida et al. | |
| 12,535,748 | B2 | 1/2026 | Kagawa et al. | |
| 12,535,750 | B2 | 1/2026 | Aoki et al. | |
| 2003/0031946 | A1 | 2/2003 | Sugiura | |
| 2006/0067867 | A1 | 3/2006 | Ishibashi | |
| 2010/0027103 | A1 | 2/2010 | Franck | |
| 2010/0273103 | A1 | 10/2010 | Baba et al. | |
| 2011/0311910 | A1 | 12/2011 | Matsui et al. | |
| 2012/0107741 | A1 * | 5/2012 | Hiraoka | G03G 9/0821 430/137.12 |
| 2013/0296578 | A1 * | 11/2013 | Amano | G03G 9/09725 549/214 |
| 2014/0329176 | A1 | 11/2014 | Kanno et al. | |
| 2014/0377696 | A1 * | 12/2014 | Hasegawa | G03G 9/08 430/108.3 |
| 2015/0185644 | A1 | 7/2015 | Matsui et al. | |
| 2015/0378274 | A1 * | 12/2015 | Abe | G03G 9/09364 430/110.2 |
| 2018/0074421 | A1 | 3/2018 | Uchino et al. | |
| 2018/0246430 | A1 | 8/2018 | Tanaka | |
| 2019/0113858 | A1 * | 4/2019 | Kamae | G03G 9/0804 |
| 2021/0302855 | A1 | 9/2021 | Torii et al. | |
| 2023/0014130 | A1 | 1/2023 | Sano et al. | |
| 2023/0273540 | A1 | 8/2023 | Toyoda et al. | |
| 2023/0350319 | A1 | 11/2023 | Hiramatsu et al. | |
| 2023/0408942 | A1 | 12/2023 | Kagawa et al. | |
| 2023/0408945 | A1 | 12/2023 | Shibahara et al. | |
| 2023/0408946 | A1 | 12/2023 | Sato et al. | |
| 2024/0069457 | A1 | 2/2024 | Murayama et al. | |
| 2024/0264543 | A1 | 8/2024 | Fukudome et al. | |
| 2024/0264544 | A1 | 8/2024 | Kagawa et al. | |
| 2024/0264545 | A1 | 8/2024 | Ohmori et al. | |
| 2024/0369949 | A1 | 11/2024 | Katsura et al. | |
| 2024/0427258 | A1 | 12/2024 | Hiramatsu et al. | |
| 2026/0036919 | A1 | 2/2026 | Shibahara et al. | |
| 2026/0036921 | A1 | 2/2026 | Kagawa et al. | |
| 2026/0044093 | A1 | 2/2026 | Hiramatsu et al. | |

FOREIGN PATENT DOCUMENTS

| | | | |
|---|---|---|---|
| JP | H07330324 | A | 12/1995 |
| JP | H09204065 | A | 8/1997 |
| JP | H11174727 | A | 7/1999 |
| JP | 2000147831 | A | 5/2000 |
| JP | 2002-023413 | A | 1/2002 |
| JP | 2002182423 | A | 6/2002 |
| JP | 2004126249 | A | 4/2004 |
| JP | 2004126251 | A | 4/2004 |
| JP | 2007114630 | A | 5/2007 |
| JP | 2007176747 | A | 7/2007 |
| JP | 2008145490 | A | 6/2008 |
| JP | 2009031426 | A | 2/2009 |
| JP | 2009271394 | A | 11/2009 |
| JP | 2009276643 | A | 11/2009 |
| JP | 2016066049 | A | 4/2016 |
| JP | 2016167029 | A * | 9/2016 |
| JP | 2019003082 | A | 1/2019 |
| JP | 2019086705 | A | 6/2019 |
| JP | 2019109416 | A | 7/2019 |
| JP | 2020091471 | A | 6/2020 |
| JP | 2020095081 | A | 6/2020 |
| JP | 2020154294 | A | 9/2020 |
| JP | 2021148999 | A | 9/2021 |
| WO | 2004060803 | A1 | 7/2004 |

OTHER PUBLICATIONS

ECHA European Chemicals Agency, Octamethylcyclotetrasiloxane, p. 1.

* cited by examiner

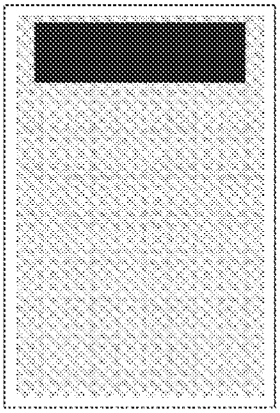

TONER

BACKGROUND OF THE INVENTION

Field of the Invention

The present disclosure relates to a toner for use in an image forming method such as electrophotography.

Description of the Related Art

In recent years, there has been a demand for longer service life and the ability to obtain high-quality images regardless of the environment in order to support the diverse usage of copiers and printers. Charging performance of toners has a great influence on high image quality, and various studies thereof have been conducted in the past.

For example, Japanese Patent Application Publication No. 2009-031426 discusses means for allowing acrylic resin to be present in a toner particle. In addition, means for externally adding a silica particle subjected to surface hydrophobization to a toner particle for the purpose of improving environmental stability have been investigated in, for example, Japanese Patent Application Publication No. 2008-145490.

In acrylic resins such as those used in Japanese Patent Application Publication No. 2009-031426, the acrylic groups are easily polarized, so the charging performance of the toner is likely to be improved. Meanwhile, in a low-humidity environment, overcharging is likely to occur, and there is a disadvantage in terms of environmental stability. Further, when imparting hydrophobicity to the toner using the technique described in Japanese Patent Application Publication No. 2008-145490, certain effects such as lowering of hygroscopicity can be seen, but it is difficult to prevent disturbance of quality such as ghosting cause by overcharging in a low-humidity environment. For the above reasons, the development of a toner with excellent charging stability regardless of the environment is desired.

SUMMARY OF THE INVENTION

The present disclosure relates to a toner that can easily maintain appropriate charging performance similar to that at normal temperature and normal humidity even when used in a low-humidity environment and that can suppress ghosting.

The present disclosure relates to a toner comprising: a toner particle; and a silica fine particle on the surface of the toner particle; wherein fragment ions corresponding to a structure represented by Formula (1) are observed in a time-of-flight secondary ion mass spectrometry measurement of the silica fine particle, (1)

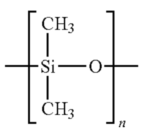

in Formula (1), n represents an integer of 1 or more, where 2.00 g of the silica fine particle is dispersed in a mixed liquid of 25.0 g of ethanol and 75.0 g of a 20 mass % NaCl aqueous solution and a titration operation using sodium hydroxide is performed, Sn defined as Formula (10) satisfies Formula (2), $0.05 \leq Sn \leq 0.20$ (2), $Sn=\{(a-b)\times c\times NA\}/(d\times e)$ (10), in Formula (10), a is a NaOH titer (L) required to adjust to 9.0 a pH of the mixed solution in which the silica fine particle has been dispersed, b is a NaOH titer (L) required to adjust to 9.0 the pH of the mixed solution of 25.0 g of ethanol and 75.0 g of a 20 mass % aqueous solution of NaCl, c is the concentration (mol/L) of the NaOH solution used for titration, NA is Avogadro's number, d is the mass (g) of the silica fine particle, and e is a BET specific surface area ($nm^2/g$) of the silica fine particle, in a chemical shift obtained by solid-state $^{29}Si$-NMR DD/MAS of the silica fine particle, with D denoting an area of a peak having a peak top present in a range from −25 to −15 ppm, S denoting the sum total of areas of peaks of an M unit, a D unit, a T unit and a Q unit present in a range from −140 to 100 ppm, and B ($m^2/g$) denoting a specific surface area of the silica fine particle, a value (D/S)/B of a ratio of (D/S) relative to B is $5.7\times10^{-4}$ to $56\times10^{-4}$; (D/S)/B measured after washing of the silica fine particle with chloroform is $1.7\times10^{-4}$ to $56\times10^{-4}$; with D1 as an area of a peak having a peak top present in a range of more than −19 ppm and −17 ppm or less, in the chemical shift, a value (D1/D) of a ratio of D1 relative to D is 0.10 to 0.30; and a vinyl-based resin having a structure represented by Formula (9) is present on the surface of the toner particle, (9)

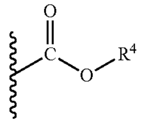

in Formula (9), $R^4$ is a hydrocarbon group having 1 to 10 carbon atoms.

According to the present disclosure, it is possible to provide a toner that can easily maintain appropriate charging performance similar to that at normal temperature and normal humidity even when used in a low-humidity environment and that can suppress ghosting. Further features of the present disclosure will become apparent from the following description of exemplary embodiments with reference to the attached drawings.

BRIEF DESCRIPTION OF THE DRAWINGS

The FIGURE is a schematic diagram of an image for ghosting evaluation.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily. Further, a monomer unit refers to the reacted form of the monomer substance in the polymer.

The present inventors have found that the above disadvantages can be solved by combining a toner particle having a specific acrylic group and a silica fine particle which has an appropriate amount of D1 structure as a result of effectively arranging dimethylsiloxane chains and in which the amount of silanol groups is controlled.

In electrophotography, toners are required to have excellent properties such as flowability and charging performance. Focusing particularly on image quality, it is important to have high charging performance in order to faithfully reproduce images on an electrostatic latent image bearing member. However, charging performance is susceptible to environmental influences, and moisture in the atmosphere, in particular, often degrades toner charging. Since printers are used not only in air-conditioned, relatively low-humidity environments, but also in normal-temperature, normal-humidity, and high-humidity environments, fluctuations in image quality caused by environment become a disadvantage.

Among the disadvantages of image quality, the inventors of the present disclosure focused on ghosting, which is a history of the upper end portion of the image that remains in the image in the lower portion. Ghosting is a phenomenon that occurs when the charging performance of the toner carried on the toner carrying member is too high or too low after the toner placed on the toner carrying member made a transition to the electrostatic latent image bearing member. Conventionally, various studies have been conducted to improve charging performance. According to the studies by the inventors of the present disclosure, where an acrylic group is arranged on the toner particle surface, the acrylic group is polarized thereby ensuring excellent charging performance, but a decrease in charge is observed in a high-humidity environment due to the absorption of moisture by the acrylic group.

It was found that by combining a silica fine particle having D units and D1 units on the surface and having a controlled amount of silanol groups with the toner particle having the acrylic group described above, it is possible to reduce the difference in charging performance demonstrated in a normal-temperature and normal-humidity environment and a high-temperature and low-humidity environment.

The present disclosure relates to a toner comprising: a toner particle; and a silica fine particle on the surface of the toner particle; wherein fragment ions corresponding to a structure represented by Formula (1) are observed in a time-of-flight secondary ion mass spectrometry measurement of the silica fine particle, (1)

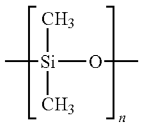

in Formula (1), n represents an integer of 1 or more, where 2.00 g of the silica fine particle is dispersed in a mixed liquid of 25.0 g of ethanol and 75.0 g of a 20 mass % NaCl aqueous solution and a titration operation using sodium hydroxide is performed, Sn defined as Formula (10) satisfies Formula (2), $0.05 \leq Sn \leq 0.20$ (2), $Sn = \{(a-b) \times c \times NA\}/(d \times e)$ (10), in Formula (10), a is a NaOH titer (L) required to adjust to 9.0 a pH of the mixed solution in which the silica fine particle has been dispersed, b is a NaOH titer (L) required to adjust to 9.0 the pH of the mixed solution of 25.0 g of ethanol and 75.0 g of a 20 mass % aqueous solution of NaCl, c is the concentration (mol/L) of the NaOH solution used for titration, NA is Avogadro's number, d is the mass (g) of the silica fine particle, and e is a BET specific surface area ($nm^2/g$) of the silica fine particle, in a chemical shift obtained by solid-state $^{29}Si$-NMR DD/MAS of the silica fine particle, with D denoting an area of a peak having a peak top present in a range from −25 to −15 ppm, S denoting the sum total of areas of peaks of an M unit, a D unit, a T unit and a Q unit present in a range from −140 to 100 ppm, and B ($m^2/g$) denoting a specific surface area of the silica fine particle, a value (D/S)/B of a ratio of (D/S) relative to B is $5.7 \times 10^{-4}$ to $56 \times 10^{-4}$; (D/S)/B measured after washing of the silica fine particle with chloroform is $1.7 \times 10^{-4}$ to $56 \times 10^{-4}$; with D1 as an area of a peak having a peak top present in a range of more than −19 ppm and −17 ppm or less, in the chemical shift, a value (D1/D) of a ratio of D1 relative to D is 0.10 to 0.30; and a vinyl-based resin having a structure represented by Formula (9) is present on the surface of the toner particle, (9)

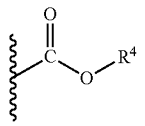

in Formula (9), $R^4$ is a hydrocarbon group having 1 to 10 carbon atoms.

The effects obtained by combining the specific silica fine particle and the toner particle will be described hereinbelow. The surface treatment of the silica fine particle can be confirmed by time-of-flight secondary ion mass spectrometry (TOF-SIMS). In measurements of silica fine particle by time-of-flight secondary ion mass spectrometry TOF-SIMS, it is necessary to observe fragment ions corresponding to the structure represented by Formula (1). Observation of fragment ions represented by Formula (1) indicates that the silica fine particle is surface-treated with a surface treatment agent having a dimethylsiloxane structure.

(1)

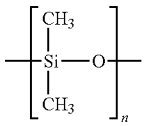

(In Formula (1), n is an integer of from 1 or more (preferably from 1 to 500, more preferably from 1 to 200, still more preferably from 1 to 100, and even more preferably from 1 to 80.) TOF-SIMS is a method for analyzing the composition of a sample surface by irradiating the sample with ions and analyzing the mass of secondary ions emitted from the sample. Since the secondary ions are emitted from a region several nanometers deep from the sample surface, the structure near the surface of the silica fine particle can be analyzed. The mass spectrum of secondary ions obtained by the measurement represents fragment ions that reflect the molecular structure of the surface treatment agent of the silica fine particle.

Fragment ions corresponding to the structure represented by Formula (1) are observed in measurement of the silica fine particle by TOF-SIMS. In the present disclosure, a structural unit having this structure is defined as a D unit. Where fragment ions of D units are observed by TOF-SIMS, it means that the silica fine particle is surface-treated with a surface treatment agent including D units.

Next, it is necessary to control the amount of Si—OH groups on the silica fine particle. When a silica fine particle is dispersed in a solvent and a titration operation is performed using sodium hydroxide, it is necessary to satisfy Formula (2). This titration operation aims at neutralization of acid groups (Si—OH groups) present on the surface of the silica fine particle. The amount of Si—OH groups can be evaluated by the value Sn (number/$nm^2$) obtained from the titer of sodium hydroxide. This is because the Si—OH of the base of the silica fine particle or the Si—OH group derived from the surface treatment agent causes a neutralization reaction with sodium hydroxide. Silanol groups (Si—OH groups) present on the surface of the silica fine particle base, OH groups at the ends of a dimethylsiloxane chain, acid groups derived from the surface treatment agent, and the like are present on the surface of the silica fine particle. These acid groups are likely to interact with moisture in the air but are also likely to be polarized, and when present on the toner particle surface, these groups tend to excel in charge-providing performance.

According to the studies conducted by the present inventors, it was found that within a range that satisfies Formula (2), excellent charge-providing performance can be obtained while reducing the influence of moisture. Below the lower limit of the Formula (2), the charge-providing property is insufficient, and the charging performance of the toner is lowered. Meanwhile, where the upper limit of Formula (2) is exceeded, the number of Si—OH groups on the surface of the silica fine particle becomes excessive, and for example, in a high-humidity environment, the charge-providing performance of the silica fine particle decreases due to the influence of moisture.

Conversely, for example, in a normal-temperature and normal-humidity environment, the silica fine particle has a charge-providing performance. Also, in a low-humidity environment, the silica fine particle is easily affected by moisture and overcharging is likely to occur. Therefore, the charge quantity of the toner varies greatly depending on the environment, and the developing performance fluctuates, so ghosting is likely to occur.

Specifically, where 2.00 g of the silica fine particle is dispersed in a mixed liquid of 25.0 g of ethanol and 75.0 g of a 20% by mass NaCl aqueous solution and a titration operation using sodium hydroxide is performed, Sn defined as Formula (10) satisfies the following Formula (2) $0.05 \leq Sn \leq 0.20$ (2)

$$Sn=\{(a-b)\times c\times NA\}/(d\times e) \quad (10)$$

in Formula (10), a is a NaOH titer (L) required to adjust the mixed liquid, in which the silica fine particle is dispersed, to pH 9.0, b is a NaOH titer (L) required to adjust the mixed liquid of 25.0 g of ethanol and 75.0 g of a 20% by mass NaCl aqueous solution to pH 9.0, c is the concentration (mol/L) of the NaOH solution used for titration, NA is Avogadro's number, d is the mass (g) of the silica fine particle, and e is a BET specific surface area ($nm^2$/g) of the silica fine particle.

Sn is obtained by the above titration operation. If there are silanol groups on the surface of the silica fine particle, these groups are immediately neutralized by sodium hydroxide, so it is believed that Sn correlates with the amount of silanol groups per unit surface area of the silica fine particle surface. When Sn satisfies Formula (2), the amount of silanol groups on the surface of the silica fine particle base and the silanol groups in the structure derived from the surface treatment agent of the silica fine particle become appropriate, and the charge retention property is improved regardless of the environment. Sn is preferably from 0.05 to 0.18, more preferably from 0.10 to 0.15.

Sn can be increased by performing the treatment under conditions where the reaction of the surface treatment agent does not proceed so that the Si—OH groups present on the surface of the silica fine particle base remain thereon, or by adding the treatment agent only in such a small amount that the surface of the silica fine particle base is not completely covered thereby. Meanwhile, Sn can be decreased by surface-treating the silica fine particle to reduce the number of silanol groups on the silica fine particle surface, or by treating the silica fine particle with a surface treatment agent having no silanol groups. It is also effective to extend the reaction time or raise the temperature during the surface treatment.

As described above, the above disadvantages can be solved by combining silica having a specific structure on the surface and a toner particle having a specific resin on the surface. Therefore, it is necessary to control a surface treatment state ((D/S)/B, D1/D) of the silica fine particle. The surface treatment state of the silica fine particle is calculated by a solid-state $^{29}$Si-NMR DD/MAS method. In the DD/MAS measurement method, since all Si atoms in the measurement sample are observed, quantitative information on the chemical bonding state of the Si atoms in the silica fine particle can be obtained.

Generally, in solid-state $^{29}$Si-NMR, to a Si atom in a solid sample, four types of peaks, namely, an M unit (Formula (4)), a D unit (Formula (5)), a T unit (Formula (6)), and a Q unit (Formula (7)), can be observed.

$$\text{M unit}:(R_i)(R_j)(R_k)SiO_{1/2} \quad \text{Formula (4)}$$

$$\text{D unit}:(R_g)(R_h)Si(O_{1/2})_2 \quad \text{Formula (5)}$$

$$\text{T unit}:R_mSi(O_{1/2})_3 \quad \text{Formula (6)}$$

$$\text{Q unit}:Si(O_{1/2})_4 \quad \text{Formula (7)}$$

$R_i$, $R_j$, $R_k$, $R_g$, $R_h$, and $R_m$ in the Formulas (4), (5), and (6) are each an alkyl group such as a hydrocarbon group having from 1 to 6 carbon atoms, a halogen atom, a hydroxy group, an acetoxy group, an alkoxy group, or the like bonded to silicon.

When a silica fine particle is measured by DD/MAS, the Q unit indicates a peak corresponding to Si atoms in the silica fine particle base before surface treatment. In the present disclosure, when a silica fine particle is surface-treated with a surface treatment agent such as silicone oil, the silica fine particle is assumed to include the portion derived from the surface treatment agent. In addition, a silica fine particle before being surface-treated is also referred to as a silica fine particle base. The BET specific surface area of the silica fine particle after the surface treatment is denoted by B ($m^2$/g). The M unit, D unit, and T unit each show a peak corresponding to the structure of the surface treatment agent for the silica fine particle represented by the above Formulas (4) to (6).

Each can be identified by the chemical shift value of the solid-state $^{29}$Si-NMR spectrum, the chemical shift being from −130 ppm to −85 ppm for the Q unit, from −65 ppm to −51 ppm for the T unit, from −25 ppm to −15 ppm for the D unit, and from 10 to 25 ppm for the M unit, and each unit can be quantified by a respective integrated value. The respective peak integrated values are denoted by Q, T, D, and M, and the sum of these integrated values is denoted by S.

The area of the peak where the peak top is present in the range of from −25 ppm to −15 ppm in the chemical shifts obtained by the solid-state $^{29}$Si-NMR DD/MAS method of the silica fine particle is D, and the sum of the areas of the peaks of the M unit, D unit, T unit, and Q unit present in the range from −140 ppm to 100 ppm is S. The specific surface area of the silica fine particle is denoted by B ($m^2/g$). At this time, the ratio (D/S)/B of (D/S) to B (hereinafter also referred to as DSB) is from $5.7\times10^{-4}$ to $56\times10^{-4}$.

Further, (D/S)/B measured after washing the silica fine particle with chloroform (hereinafter also referred to as DSB-W) is from $1.7\times10^{-4}$ to $56\times10^{-4}$. DSB means the amount of Si atoms per unit surface area that constitute the D unit with respect to the amount of Si atoms in the entire silica fine particle. Here, a silica fine particle for which the fragment represented by Formula (1) is observed in TOF-SIMS and which has a peak at the D unit in the solid-state $^{29}$Si-NMR measurement has been surface-treated by a compound having a dimethylsiloxane structure.

In other words, DSB represents the amount of dimethylsiloxane on the silica fine particle surface per unit surface area. The smaller the DSB, the smaller the amount of dimethylsiloxane on the silica fine particle surface, and although such particle, as an external additive, does not hinder flowability, since silanol groups tend to remain on the silica fine particle base surface, the effect of moisture in an environment with a relatively high humidity cannot be suppressed, and therefore, the improvement in charge retention property is small. Conversely, the larger the DSB, the greater the amount of dimethylsiloxane on the silica fine particle surface, but where the amount of D units is excessive, the silica fine particle, as an external additive, inhibits flowability.

Specifically, where DSB is less than $5.7\times10^{-4}$, the surface treatment of the silica fine particle is not sufficient, the charge retention property of the toner is remarkably lowered in an environment with a relatively high humidity, and ghosting occurs. Meanwhile, where DSB exceeds $56\times10^{-4}$, the amount of dimethylsiloxane becomes excessive and the flowability of the toner is remarkably lowered. Furthermore, in a low-humidity environment, the toner is excessively charged and electrostatically aggregated, which significantly lowers the flowability of the toner, thereby reducing the charge retention property and facilitating ghosting. DSB is preferably from $5.7\times10^{-4}$ to $49\times10^{-4}$, more preferably from $7.1\times10^{-4}$ to $49\times10^{-4}$.

DSB can be increased by increasing the amount of the surface treatment agent during the surface treatment of the silica fine particle base or by selecting a compound having many D units such as polydimethylsiloxane or cyclic siloxane as the surface treatment agent. Meanwhile, DSB can be reduced by reducing the amount of the surface treatment agent during the surface treatment of the silica fine particle base or by selecting a compound having no D unit such as hexamethyldisiloxane as the surface treatment agent.

Therefore, the silica fine particle is surface-treated with an adequate amount of D units, and the silanol amount on the silica fine particle surface is controlled within an adequate range. DSB-W is discussed hereinbelow. As described above, DSB-W is DSB after washing a silica fine particle with chloroform. This value represents the amount of silicon atoms of D units chemically bonded to the silica fine particle. Where DSB-W is less than $1.7\times10^{-4}$, the amount of the surface treatment agent bonded to the silica fine particle surface is insufficient, and the surface treatment agent of the silica fine particle is, for example, peeled off during long-term use, resulting in significant decrease in the charge retention property of toner and occurrence of ghosting. Where DSB-W exceeds $56\times10^{-4}$, the flowability tends to decrease, and in particular, in a low-humidity environment, the flowability is remarkably decreased in combination with excessive charging of the toner, resulting in a decrease in the charge retention property and a tendency to generate ghosts.

The lower limit of DSB-W is preferably $4.9\times10^{-4}$ or more, more preferably $6.0\times10^{-4}$ or more. The upper limit is preferably $49\times10^{-4}$ or less, more preferably $33\times10^{-4}$ or less.

In the present description, $ZZ\times10^{-4}$ is synonymous with $Z.Z\times10^{-3}$. For example, $33\times10^{-4}$ is synonymous with $3.3\times10^{-3}$.

Here, the terminal polar group of the structure derived from the surface treatment agent of the silica fine particle is defined as D1. D1 corresponds to a peak having a peak top in the range of more than −19 ppm to not more than −17 ppm in the chemical shift obtained by solid-state $^{29}$Si-NMR described hereinbelow. In the silica fine particle treated with D units, D1 means a polar group at the end of the D unit and has a structure represented by Formula (8).

$$\text{D1:—Si—OR}^3 \quad (8)$$

($R^3$ in Formula (8) is a methyl group, an ethyl group, or a hydrogen atom.)

As a result of intensive studies by the present inventors, it was found that the charge retention property is improved and ghosting can be suppressed regardless of the environment when the silica fine particle having adequate amounts of D units and silanol has an appropriate amount of D1.

The inventors assumed the following regarding the effect of D1. Compared with a polar group such as a silanol group in the Q unit present on the surface of the silica fine particle base, the polar group of D1 at the end of the D unit has moderately high hydrophobicity. It is considered that this is influenced by the hydrophobicity derived from the carbon atom bonded to Si. The polar group at the end of the D unit, which has moderately high hydrophobicity, has the effect of imparting charging performance to the end of the hydrophobic group thereof. In addition, the polar group D1 at the end of the D unit is moderately more hydrophobic than the silanol group present on the surface of the silica fine particle base. Also, as represented by DSB-W, the D unit is bonded to the silica fine particle base to some extent, and D1 at the end of the D unit is located away from the surface of the silica fine particle base. Therefore, with D1 at the end of the D unit, the effect of moisture on the silica fine particle is low, and it becomes easy to maintain good charge retention property.

Based on the above, the surface of the silica fine particle is treated with a treatment agent having D units, the amount of silanol groups on the silica fine particle surface is controlled to an adequate amount, and a certain amount of D1 is introduced at the end of the D units. That is, it is considered that by setting the amount of silanol groups, DSB, DSB-W, and D1/D in the silica fine particle to appropriate ranges, it is possible to provide a toner that excels in charge retention property and flowability and makes it possible to suppress ghosting in both the normal-temperature and normal-humidity environment and the high-temperature and low-humidity environment.

Therefore, the area of a peak having a peak top present in the range of more than −19 ppm and not more than −17 ppm in the chemical shift obtained by the solid-state $^{29}$Si-NMR DD/MAS of the silica fine particle is defined as D1. The value of the ratio (D1/D) of D1 to D is from 0.10 to 0.30. The D unit peak in solid-state $^{29}$Si-NMR measurement is separated into two, the peak that appears in the range of more than −19 ppm and not more than −17 ppm in the chemical shift is defined as peak D1, and the peak that appears in the range of from −23 ppm to −19 ppm is defined as D2.

It is known that among the D units measured on the silica fine particle, a Si atom bonded to the functional group at the end of the D unit corresponds to the peak D1. Also, it is known that a Si atom in a dimethylsiloxane chain corresponds to the peak D2. That is, it can be determined that the larger the integrated value of the peak D1, the more the terminal polar groups in the D units. That is, D1/D means the amount of polar groups in the D units of the treatment agent. It can be determined that the larger the D1/D, the more the D unit terminal polar groups take part in the treatment.

Where D1/D is less than 0.10, the amount of polar groups is small, the charging performance in a normal-temperature and normal-humidity environment is insufficient, the charge retention property is deteriorated, and ghosting occurs. Meanwhile, where D1/D exceeds 0.30, the amount of polar groups is large, resulting in excessive charging performance especially in a low-humidity environment. D1/D is preferably 0.10 or more, more preferably 0.18 or more. Meanwhile, the upper limit is preferably 0.25 or less, more preferably 0.22 or less.

Since D1/D is derived from the structure of the treatment agent that is used to treat the surface of the silica fine particle, D1/D can be controlled by the type, amount added, and reaction conditions of the treatment agent. For example, it is preferable to use a treatment agent having many D1 structures, or to use a cyclic siloxane, such as octamethyltetrasiloxane, that opens a ring to react with the silica fine particle surface, or a low-molecular-weight polydimethylsiloxane.

In addition, D1/D can be increased by setting the reaction conditions (temperature, time) of the surface treatment agent to generate Si—OH. Meanwhile, D1/D can be reduced by using a treatment agent that does not have the D1 structure and treating under conditions such that the D1 structure does not appear. For example, there are methods such as treatment with hexamethyldisilazane and physical adhesion of polydimethylsiloxane.

A vinyl resin having a structure represented by Formula (9) (preferably an alkoxycarbonyl group having from 1 to 10 (preferably from 1 to 8, more preferably from 2 to 6) carbon atoms) is present on the surface of the toner particle. That is, the toner contains a vinyl resin having an alkoxycarbonyl group on the surface of the toner particle. In Formula (9), $R^4$ is a hydrocarbon group (preferably an alkyl group) having from 1 to 10 (preferably from 1 to 8, more preferably from 2 to 6) carbon atoms.

Due to the presence of such a vinyl resin on the surface of the toner particle, charging stability is remarkably improved in the combination of a toner particle with silica having fragment ions of Formula (1) and satisfying the aforementioned ranges of D1/D, DSB, DSB-W, and Sn. This is because Si—OR groups (R is a hydrogen atom, a methyl group, or an ethyl group) such as silanol groups of the silica fine particle are polarized and have a polarity such as Si—O-Rot, thereby ensuring charge-providing performance. Meanwhile, the structure of Formula (9) is also easily polarized and shows excellent charging performance but tends to be excessively charged in a low-humidity environment.

According to the studies conducted by the present inventors, the combination with the silica fine particle tends to prevent excessive charging in a low-humidity environment while maintaining excellent charging performance. This is apparently because a state in which polarization is spread and a charged portion is expanded is assumed and local excessive charging can be prevented by electrostatic interaction of the polarization structure of the Si—OR group on the surface and the polarization structure of the structure represented by Formula (9).

(9)

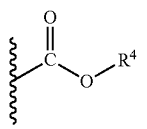

Further, where the abundance ratio of the structure represented by Formula (9) on the surface of the toner particle is denoted by Sa (% by area), Sa is preferably 50% by area or more, more preferably 70% by area or more, and still more preferably 90% by area or more. Although the upper limit is not particularly limited, it is preferably 100% by area or less and 99% by area or less. Sa can be controlled by adjusting the structure of a resin, such as a binder resin, that may be present on the surface of toner particle, actively forming a shell layer on the toner, and adjusting the structure of the shell layer. The presence of the vinyl resin having the structure represented by Formula (9) on the toner particle surface can be confirmed by TOF-SIMS. The area ratio of the toner particle surface can be calculated by performing mapping processing so that the portion where the structure represented by Formula (9) has been detected by TOF-SIMS is colored and calculating the ratio to the analyzed area. The detailed procedure will be described hereinbelow.

Where the coverage of the surface of the toner particle by the silica fine particle that is calculated from an image of the toner surface observed by a scanning electron microscope (SEM) is denoted by Ssi, the Ssi is preferably from 30% by area to 100% by area. Where the coverage is 30% by area or more, a sufficient effect on charge retention property can be obtained. The lower limit of Ssi is preferably 30% by area or more, more preferably 35% by area or more, and still more preferably 40% by area or more. The upper limit is preferably 90% by area or less, more preferably 80% by area or less, even more preferably 60% by area or less, and even more preferably 50% by area or less. The coverage Ssi can be controlled by the amount of the silica fine particle added to the toner.

The ratio (Sa/Ssi) of the abundance ratio Sa to the coverage Ssi described above is preferably from 0.25 to 3.00. When Sa/Ssi is within the above range, the silica fine particle tends to suppress overcharging caused by the structure represented by Formula (9) in a low-humidity environment through interaction with each other, and the charging performance in a low-humidity environment is further improved without impairing the charging performance in a normal-temperature and normal-humidity environment. The lower limit of Sa/Ssi is preferably 0.50 or more, more preferably 1.50 or more, and even more preferably 2.00 or more. The upper limit is preferably 2.80 or less, more preferably 2.50 or less, and even more preferably 2.40 or less.

Further, the content of the silica fine particle is preferably from 0.3 parts by mass to 2.0 parts by mass, more preferably from 0.4 parts by mass to 1.2 parts by mass, and even more preferably from 0.5 parts by mass to 0.9 parts by mass with respect to 100 parts by mass of the toner particle. By setting the content of the silica fine particle within the above range, it becomes easier to control the coverage of the toner particle by the silica fine particle within a desired range.

In addition, the number-average particle diameter of the primary particle of the silica fine particle is preferably from 5 nm to 50 nm, more preferably from 10 nm to 40 nm, and even more preferably from 20 nm to 30 nm. By externally adding the silica fine particle having the above particle diameter range to the toner particle, it becomes easier to achieve toner flowability and charge retention property and suppress ghosting.

The silica fine particle preferably contains a silica fine particle with a small particle diameter and a silica fine particle with a large particle diameter. The number-average particle diameter of the primary particle of the small-diameter silica fine particle is preferably from 5 nm to 25 nm, more preferably from 10 nm to 20 nm. The number-average particle diameter of the primary particle of the large-diameter silica fine particle is preferably more than 25 nm and 50 nm or less, more preferably from 30 nm to 40 nm. The BET specific surface area of the small-diameter silica fine particle is preferably from 100 $m^2/g$ to 500 $m^2/g$, more preferably from 150 $m^2/g$ to 300 $m^2/g$. Also, the BET specific surface area of the large-diameter silica fine particle is preferably from 10 $m^2/g$ to 100 $m^2/g$, more preferably from 30 $m^2/g$ to 80 $m^2/g$. The mass-based content ratio of the small-diameter silica fine particle and the large-diameter silica fine particle is preferably from 20:1 to 5:1, more preferably from 15:1 to 7:1 (small-diameter silica fine particle: large-diameter silica fine particle). The BET specific surface area B of the silica fine particle after surface treatment is preferably from 40 $m^2/g$ to 200 $m^2/g$, more preferably from 100 $m^2/g$ to 150 $m^2/g$.

From the viewpoint of further suppressing overcharging of the silica fine particle in a low-humidity environment, it is preferable to use both small-diameter silica fine particle and large-diameter silica fine particle. Specifically, where the ratio of particle diameters (number-average particle diameters of the primary particle) of large-particle-diameter silica to small-particle-diameter silica is from 1.2 to 2.5, good developing performance and charging performance are likely to be obtained in the electrophotographic process.

In addition, from the viewpoint of charging uniformity, it is preferable that the small-diameter silica fine particle and the large-diameter silica fine particle be subjected to the same surface treatment. The number-average particle diameter of the silica fine particle can be controlled by the mixing ratio of the small-diameter silica fine particle and the large-diameter silica fine particle and the number-average particle diameter of each.

The silica fine particle is more preferably surface-treated with at least a compound represented by Formula (3).

(3)

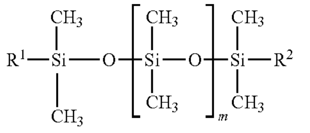

In Formula (3), $R^1$ and $R^2$ are each independently a carbinol group, a hydroxy group, an epoxy group, a carboxy group, an alkyl group (preferably having from 1 to 6 carbon atoms, more preferably from 1 to 3 carbon atoms), or a hydrogen atom. m is the average number of repeating units and is an integer of from 1 to 200 (preferably from 30 to 150, more preferably from 70 to 130).

The surface treatment agent of Formula (3) can further improve the charge retention property and suppress ghosting. The surface treatment agent to be used is not particularly limited as long as it is a compound represented by Formula (3), and known agents can be used. These may be used alone or in combination of two or more. In addition, two or more types of surface treatment agents having different functional groups may be used sequentially or in a mixture, or two or more types of surface treatment agents having the same functional group but different viscosities and molecular weight distributions may be used sequentially or in a mixture.

The carbon amount immobilization rate (C amount immobilization rate) when the silica fine particle is washed with chloroform is preferably from 30% to 70%, more preferably from 50% to 70%, and even more preferably from 60% to 65%. The carbon element contained in the silica fine particle is derived from carbon in the surface treatment agent and can be controlled by changing the structure of the surface treatment agent and treatment conditions (treatment temperature, treatment time, viscosity, addition amount, and the like). Here, the immobilization rate based on the amount of C in the surface treatment agent corresponds to the amount of the surface treatment agent chemically bonded to the surface of the silica fine particle base. The coefficient of friction between the silica fine particle and the members inside the toner cartridge is made adequate by controlling the C amount immobilization rate due to the surface treatment agent in the silica fine particle within the above range. In addition, the amount of silanol groups on the surface of the silica fine particle base is reduced, control of D1/D is facilitated, and overcharging in a low-humidity environment may be easier suppressed. As a result, better results can be obtained in terms of stability of charging performance and suppression of ghosting.

The carbon amount (C amount) in the silica fine particle measured by a carbon/sulfur analyzer is preferably from 1.5% by mass to 8.0% by mass, more preferably from 2.5% by mass to 7.0% by mass, even more preferably from 3.5% by mass to 6.0% by mass, and still more preferably from 4.0% by mass to 5.5% by mass.

The toner preferably contains a strontium titanate fine particle in addition to the silica fine particle on the surface of the toner particle. The value of the ratio (Si/Sr) of the content of the silica fine particle to the content of the strontium titanate fine particle as determined by fluorescent X-ray analysis in the toner is preferably from 0.2 to 2.5, more preferably from 0.3 to 1.5, and even more preferably from 0.4 to 1.0. The presence of the strontium titanate fine particle on the toner surface can further improve the charge retention property of the toner and further suppress ghosting. By controlling Si/Sr within the above range, it is possible to improve the charge retention property and further suppress ghosting. The content ratio of the silica particle and strontium titanate is calculated from the signal intensity ratio of Si atoms and Sr atoms in strontium titanate obtained by fluorescent X-ray analysis of the toner. The measurement method of fluorescent X-ray analysis will be described hereinbelow.

The content of the strontium titanate fine particle in the toner is preferably from 0.01 parts by mass to 2.00 parts by mass, more preferably from 0.50 parts by mass to 1.50 parts by mass, and even more preferably from 0.80 parts by mass to 1.20 parts by mass with respect to 100 parts by mass of the toner particle.

The toner particle may contain a colorant. Any colorant can be used. Examples of the colorant include organic pigments, organic dyes, inorganic pigments, and the like, but there is no particular limitation, and known colorants can be used. Among them, it is preferable to use magnetic bodies. This is because a magnetic body present on the toner particle surface not only serves as a colorant, but also has the effect of moderately lowering the charging performance of the surface. A preferable addition amount is from 30 parts by mass to 150 parts by mass with respect to 100 parts by mass of the binder resin. The number-average particle diameter of the primary particle of the magnetic bodies contained in the toner of the present disclosure is preferably 500 nm or less, more preferably from 50 nm to 300 nm. The number-average particle diameter of the primary particle of the magnetic bodies present in the toner particle can be measured using a transmission electron microscope.

Examples of magnetic bodies include iron oxides such as magnetite, maghemite, ferrite, and the like; metals such as iron, cobalt, and nickel; alloys of these metals and metals such as aluminum, copper, magnesium, tin, zinc, beryllium, calcium, manganese, selenium, titanium, tungsten and vanadium, mixtures thereof, and the like. Moreover, the magnetic bodies may be subjected to a known surface treatment as necessary.

The silica fine particle is preferably a hydrophobized silica particle obtained by heat-treating a silica fine particle base together with a cyclic siloxane and then heat-treating with silicone oil. The value of the ratio (X/Y) of the treatment amount X with the cyclic siloxane to the treatment amount Y with the silicone oil is preferably from 0.60 to 1.20, more preferably from 0.60 to 1.10, and even more preferably from 0.70 to 1.00. By controlling X/Y within the above range, it becomes easier to control the value of D1/D within the target range. X/Y is obtained by the following formula.

X/Y=(C amount of the silica fine particle treated with cyclic siloxane: intermediate C amount)/{(C amount of the silica fine particle treated with silicone oil after treatment with cyclic siloxane:final product C amount)−(C amount of the silica fine particle treated with cyclic siloxane:intermediate C amount)}.

The intermediate C amount is preferably from 0.5% by mass to 5.0% by mass, more preferably from 1.0% by mass to 4.0% by mass, even more preferably from 1.5% by mass to 3.0% by mass, and still more preferably from 1.8% by mass to 2.5% by mass. The final product C amount is preferably from 1.5% by mass to 8.0% by mass, more preferably 2.5% by mass to 7.0% by mass, even more preferably from 3.5% by mass to 6.0% by mass, and still more preferably 4.0% by mass to 5.5% by mass.

Silica fine particles obtained by a known method can be used without any particular limitation as the silica fine particle base which is a base material before surface treatment with silicone oil or the like. Typical examples include fumed silica, wet silica, and sol-gel silica. Also, these may be partially or wholly fused silica.

For the silica fine particle base, it is possible to select, as appropriate, and use a suitable one from fumed silica, wet silica, and the like according to the required properties of individual toners. In particular, fumed silica is excellent in the flowability-imparting effect, and is suitable as a silica fine particle base for use as an external additive for electrophotographic toners.

The silica fine particle obtained by surface treatment on the silica fine particle base for the purpose of imparting hydrophobicity and flowability is used. As a surface treatment method, there is a method of chemically treating with a silicon compound that reacts with or physically adsorbs to the silica fine particle base. The method of surface-treating the silica fine particle base is not particularly limited and can be carried out by bringing a surface treatment agent containing siloxane bonds into contact with the silica fine particle. From the viewpoint of uniformly treating the surface of the silica fine particle base and easily achieving the above physical properties, it is preferable to bring the surface treatment agent into contact with the silica fine particle base in a dry manner. As will be described hereinbelow, a method of contacting the vapor of a surface treatment agent with raw silica fine particle, or a method of spraying an undiluted solution of the surface treatment agent or a solution obtained by diluting with various solvents to bring the solution into contact with the silica fine particle base can be used.

As a method for surface-treating a silica fine particle base, a method for producing a silica fine particle is preferable that includes a step of surface-treating (dry treatment) the silica fine particle base with a cyclic siloxane as the first treatment, and a step of surface-treating (dry treatment) the silica fine particle base after the cyclic siloxane treatment with silicone oil as the second treatment. The silica fine particle is preferably obtained by treating a silica fine particle with cyclic siloxane and then treating the treatment product with silicone oil. A method for producing a toner preferably includes a step of preparing a silica fine particle obtained by the above method.

Regarding the first treatment, high-temperature treatment with a cyclic siloxane having a low molecular weight can efficiently reduce the amount of silanol groups on the surface of the silica fine particle base and also add a short dimethylsiloxane chain having terminal OH groups to the surface of the silica fine particle base. The temperature for treating the surface of the silica fine particle base with a cyclic siloxane is preferably 300° C. or higher. Where the temperature is 300° C. or higher, the amount of silanol groups on the surface of the silica fine particle base can be effectively reduced. Moreover, where the treatment temperature is 300° C. or higher, siloxane bonds are generated and broken, and the surface of the silica fine particle base can be treated more uniformly while controlling to obtain uniform siloxane chain lengths. The temperature for treating the surface of the silica fine particle base with a cyclic siloxane is preferably 310° C. or higher, more preferably 320° C. or higher, and even more preferably 330° C. or higher. Although the upper limit is not particularly limited, it is preferably 380° C. or lower, more preferably 350° C. or lower.

After the cyclic siloxane treatment, the silica fine particle base subjected to the cyclic siloxane treatment is heat-treated with silicone oil as the second treatment. The silicone oil bonds with the terminal OH groups of the component obtained by reaction with the cyclic siloxane in the first treatment, and a long-chain dimethylsiloxane component can be introduced onto the silica fine particle surface. The temperature at which the surface of the silica fine particle base is treated with silicone oil is preferably 300° C. or higher, more preferably 320° C. or higher, and even more preferably 330° C. or higher. Although the upper limit is not particularly limited, it is preferably 380° C. or lower, more preferably 350° C. or lower. By controlling the treatment amount X with the cyclic siloxane and the treatment amount Y with the silicone oil described above, the amount of silanol component on the surface of the silica fine particle base can be reduced, the above-described D unit amount and D1 amount can be controlled, and the charging stability can be improved, without lowering the flowability of the toner, with a small surface treatment amount.

As the cyclic siloxane, at least one selected from the group consisting of low-molecular-weight cyclic siloxanes having rings with up to 10 members, such as hexamethylcyclotrisiloxane, octamethylcyclotetrasiloxane, decamethylcyclopentasiloxane, and the like, can be used. Among them, octamethylcyclotetrasiloxane is preferred. In addition, silicone oil indicates an oily substance having a molecular structure with a siloxane bond constituting a main chain, and as long as the above-mentioned Formula (3) is satisfied, generally available silicone oils can be used without particular limitation. Specific examples include silicone oils composed of linear polysiloxane skeletons such as dimethyl silicone oil, alkyl-modified silicone oil, olefin-modified silicone oil, fatty acid-modified silicone oil, alkoxy-modified silicone oil, polyether-modified silicone oil, carbinol-modified silicone oil, and the like.

The treatment time in the first treatment and the second treatment varies depending on the treatment temperature and the reactivity of the surface treatment agent used, but is preferably from 5 min to 300 min, more preferably from 30 min to 240 min, and still more preferably from 50 min to 200 min. The treatment temperature and treatment time of the surface treatment within the above ranges are preferable from the viewpoint of sufficiently reacting the treatment agent with the silica fine particle base and from the viewpoint of production efficiency.

The surface treatment agent is brought into contact with the silica fine particle base in the first treatment preferably by a method of contacting the vapor of the surface treatment agent under reduced pressure or in an inactive gas atmosphere such as a nitrogen atmosphere. By using the vapor contact method, the surface treatment agent that does not react with the silica fine particle surface can be easily removed, and the silica fine particle surface can be adequately covered with modifying groups having appropriate polarity. When using the method of contacting the vapor of the surface treatment agent, the treatment is preferably performed at a treatment temperature equal to or higher than the boiling point of the surface treatment agent. The vapor contact may be carried out in multiple batches. When the vapor of the surface treatment agent is brought into contact in an inactive gas atmosphere such as a nitrogen atmosphere, the pressure (gauge pressure) of the vapor of the surface treatment agent in a container is preferably from 50 kPa to 300 kPa, more preferably from 150 kPa to 250 kPa.

The toner particle may contain a binder resin. Examples of the binder resin include vinyl resins, polyester resins, polyethylene naphthalate resins, and the like. The binder resin is not particular limited, and known resins can be used. Preferably, the toner particle contains a vinyl resin as the binder resin. Specific examples of vinyl resins include polystyrene and styrene-based copolymers such as styrene-propylene copolymer, styrene-vinyl toluene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-octyl methacrylate copolymer, styrene-butadiene copolymer, styrene-isoprene copolymer, styrene-maleic acid copolymer, styrene-maleic acid ester copolymer, and the like, polyacrylic acid esters, polymethacrylic acid esters, polyvinyl acetate, and the like, and these can be used singly or in combination. Among these, styrene-based copolymers are particularly preferred.

The content of the vinyl resin in the binder resin is preferably from 50% by mass to 100% by mass, more preferably from 80% by mass to 100% by mass, even more preferably from 90% by mass to 100% by mass, and still more preferably from 95% by mass to 100% by mass.

A vinyl-based monomer capable of radical polymerization can be used as a polymerizable monomer that can generate a vinyl resin. A monofunctional monomer or a polyfunctional monomer can be used as the vinyl-based monomer. Examples of the monofunctional monomer include styrene; styrene derivatives such as α-methylstyrene, β-methylstyrene, o-methylstyrene, m-methylstyrene, p-methylstyrene, p-methoxystyrene, and β-phenylstyrene; acrylic polymerizable monomers such as methyl acrylate, ethyl acrylate, n-propyl acrylate, iso-propyl acrylate, n-butyl acrylate, dibutyl phosphate ethyl acrylate, and 2-benzoyloxyethyl acrylate; methacrylic polymerizable monomers such as methyl methacrylate, ethyl methacrylate, and dibutyl phosphate ethyl methacrylate; methylene aliphatic monocarboxylic acid esters; vinyl esters such as vinyl acetate and vinyl propionate; vinyl ethers such as vinyl methyl ether, vinyl ethyl ether and vinyl isobutyl ether; and vinyl ketones such as vinyl methyl ketone, vinyl hexyl ketone, and vinyl isopropyl ketone.

Preferably, the vinyl resin is a copolymer of styrene and a (meth)acrylic acid alkyl ester having an alkyl group having from 1 to 10 (preferably from 1 to 8, more preferably from 2 to 6) carbon atoms. A copolymer of styrene and n-butyl acrylate is more preferred. The abundance ratio of the structure represented by Formula (9) can be controlled by the amount of the (meth)acrylic acid alkyl ester used in the copolymer as the binder resin.

A charge control agent may be added to the toner particle. Organometallic complex compounds and chelate compounds are effective as charge control agents for negative charging, and examples thereof include monoazo metal complex compounds; acetylacetone metal complex compounds; metal complex compounds of aromatic hydroxycarboxylic acids or aromatic dicarboxylic acids; and the like. Specific examples of commercially available products include SPILON BLACK TRH, T-77, T-95 (Hodogaya Chemical Industry Co., Ltd.), BONTRON (registered trademark) S-34, S-44, S-54, E-84, E-88, E-89 (Orient Chemical Industries Co., Ltd.).

Also, as the charge control resin, it is preferable to use a polymer or copolymer having a sulfonic acid group, a sulfonic acid salt group, or a sulfonic acid ester group. In particular, a copolymer including a sulfonic acid group-containing acrylamide-based monomer or a sulfonic acid group-containing methacrylamide-based monomer in a copolymerization ratio of 2% by mass or more is preferable as a polymer having a sulfonic acid group, a sulfonic acid salt group or a sulfonic acid ester group. The copolymerization ratio of 5% by mass or more is more preferable.

The charge control resin preferably has a glass transition temperature (Tg) of from 35° C. to 90° C., a peak molecular weight (Mp) of from 10,000 to 30,000, and a weight-average molecular weight (Mn) of from 25,000 to 50,000. When such charge control resin is used, favorable triboelectric charging property can be imparted without affecting thermal properties required of the toner particle. Furthermore, since the charge control resin contains a sulfonic acid group, the dispersibility of the charge control resin itself and the dispersibility of a colorant in the dispersion liquid of the colorant are improved, and the tinting strength, transparency, and triboelectric charging property can be further improved.

These charge control agents can be used alone or in combination of two or more. From the viewpoint of the charge quantity of the toner, the amount of these charge control agents used is preferably from 0.1 parts by mass to 10.0 parts by mass and more preferably from 0.1 parts by mass to 5.0 parts by mass per 100 parts by mass of the binder resin.

The use of a sulfonic acid resin and/or a metal complex compound as a charge control agent is preferred because excellent properties tend to be demonstrated in combination with the silica fine particle.

A release agent may be blended into the toner particle as needed to improve fixing performance. The release agent is not particularly limited, and known release agents can be used. Specific examples of the release agent include petroleum-based waxes such as paraffin wax, microcrystalline wax, petrolactam and derivatives thereof, montan wax and derivatives thereof, hydrocarbon waxes obtained by the Fischer-Tropsch process and derivatives thereof, polyolefin waxes typified by polyethylene and polypropylene, and derivatives thereof, natural waxes such as carnauba wax, candelilla wax, and the like, and derivatives thereof, ester waxes, and the like. Here, the derivatives include oxides, block copolymers with vinyl-based monomers, and graft-modified products. As the ester wax, monofunctional ester wax, bifunctional ester wax, and multifunctional ester wax such as tetrafunctional and hexafunctional ester waxes can be used.

The melting point of the release agent is preferably from 60° C. to 140° C., more preferably from 70° C. to 130° C. Where the melting point is from 60° C. to 140° C., the toner is easily plasticized at the time of fixing, and the fixing performance is improved. In addition, it is preferable that outmigration of the release agent hardly occurs even after long-term storage.

In addition to the silica fine particle and strontium titanate fine particle, the toner particle may be mixed with other external additives such as inorganic external additives to cause the adhesion thereof to the toner particle surface. Examples of inorganic external additives include hydrotalcite compounds, fatty acid metal salts, alumina, and metal oxide fine particles (inorganic fine particles) such as titanium oxide, zinc oxide fine particles, cerium oxide fine particles, and calcium carbonate fine particles.

Further, as other external additives, composite oxide fine particles using two or more kinds of metals can be used, or two or more kinds selected in arbitrary combination from these fine particle groups can be used. In addition, resin fine particles and organic-inorganic composite fine particles of resin fine particles and inorganic fine particles can also be used. These other external additives may be hydrophobized with a hydrophobizing agent.

Examples of hydrophobizing agents include chlorosilanes such as methyltrichlorosilane, dimethyldichlorosilane, trimethylchlorosilane, phenyltrichlorosilane, diphenyldichlorosilane, t-butyldimethylchlorosilane, vinyltrichlorosilane; alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and the like; silazanes such as hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane, and the like; silicone oils such as dimethyl silicone oil, methyl hydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, terminally reactive silicone oil, and the like; siloxanes such as hexamethylcyclotrisiloxane, octamethylcyclotetrasiloxane, decamethylcyclopentasiloxane, hexamethyldisiloxane, octamethyltrisiloxane, and the like; and fatty acids and metal salts thereof, such as long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, arachidonic acid, and the like, and salts of these fatty acids with metals such as zinc, iron, magnesium, aluminum, calcium, sodium, lithium, and the like.

Among these, alkoxysilanes, silazanes, and silicone oils are preferably used because the hydrophobizing treatment may be easily performed. One of these hydrophobizing agents may be used alone, or two or more thereof may be used in combination. The content of other external additives is preferably from 0.05 parts by mass to 20.0 parts by mass with respect to 100 parts by mass of the toner particle.

The weight-average particle diameter (D4) of the toner is preferably from 3.0 μm to 12.0 μm, more preferably from 4.0 μm to 10.0 μm. Where the weight-average particle diameter (D4) is within the above range, good flowability can be obtained, and the latent image can be developed faithfully.

The manufacturing method of the toner is not particularly limited, and a known manufacturing method can be adopted. Methods for producing toner include a pulverization method, a polymerization method such as a dispersion polymerization method, an association aggregation method, a dissolution suspension method, a suspension polymerization method, an emulsion aggregation method, and the like. A specific example of a pulverization method for producing toner through a melt-kneading step and a pulverization step is given below, but the invention is not limited thereto.

For example, a binder resin and, if necessary, a colorant, a release agent, a charge control agent and other additives are thoroughly mixed with a mixer such as a Henschel mixer or a ball mill (mixing step). The obtained mixture is melt-kneaded using a thermal kneader such as a twin-screw kneading extruder, a heating roll, a kneader, and an extruder (melt-kneading step).

After cooling and solidifying the resulting melt-kneaded product, pulverization using a pulverizer (pulverization step) and classification using a classifier (classification step) are performed to obtain toner particles. Further, if necessary, toner particles and external additives are mixed with a mixer such as a Henschel mixer to obtain a toner.

Examples of the mixer are presented hereinbelow. FM mixer (Nippon Coke Industry Co., Ltd.); SUPERMIXER (manufactured by Kawata Mfg. Co., Ltd.); RIBOCONE (manufactured by Okawara Mfg. Co., Ltd.); NAUTA MIXER, TURBULIZER, and CYCLOMIX (manufactured by Hosokawa Micron Corporation); SPIRAL PIN MIXER (manufactured by Pacific Machinery & Engineering Co., Ltd.); LÖDIGE MIXER (manufactured by Matsubo Corporation).

Examples of the thermal kneader are presented hereinbelow. KRC kneader (manufactured by Kurimoto, Ltd.); BUSS Co-kneader (manufactured by Buss AG); TEM-type extruder (manufactured by Toshiba Machine Co., Ltd.); TEX twin-screw kneader (manufactured by The Japan Steel Works, Ltd.); PCM kneader (manufactured by Ikegai Iron Works Co., Ltd.); a three-roll mill, a mixing roll mill, and a kneader (manufactured by Inoue Mfg. Inc.); KNEADEX (manufactured by Mitsui Mining Co., Ltd.); MS-type pressurizing kneader and KNEADER-RUDER (manufactured by Moriyama Seisakusho KK); and Banbury mixer (manufactured by Kobe Steel, Ltd.).

Examples of the pulverizer are presented hereinbelow. COUNTER JET MILL, MICRON JET, and INOMIZER (manufactured by Hosokawa Micron Corporation); IDS type mill and PJM jet pulverizer (manufactured by Nippon Pneumatic Mfg. Co., Ltd.); CROSS JET MILL (manufactured by Kurimoto Iron Works Co., Ltd.); ULMAX (manufactured by Nisso Engineering Co., Ltd.); SK Jet-O-Mill (manufactured by Seishin Enterprise Co., Ltd.); KRYPTRON (manufactured by Kawasaki Heavy Industries, Ltd.); TURBO MILL (manufactured by Turbo Kogyo Co., Ltd.); and SUPER-ROTOR (manufactured by Nisshin Engineering Co., Ltd.).

Examples of the classifier are presented hereinbelow. CLASSIEL, MICRON CLASSIFIER, and SPEDIC CLASSIFIER (manufactured by Seishin Enterprise Co., Ltd.); TURBO CLASSIFIER (manufactured by Nisshin Engineering Inc.); MICRON SEPARATOR, TURBOPLEX (ATP), and TSP SEPARATOR (manufactured by Hosokawa Micron Corporation); ELBOW JET (manufactured by Nittetsu Mining Co., Ltd.), DISPERSION SEPARATOR (manufactured by Nippon Pneumatic Industry Co., Ltd.); YM MICRO CUT (Yaskawa Co., Ltd.).

In addition, the following sieving device may be used to sieve coarse particles. ULTRASONIC (manufactured by Koeisangyo Co., Ltd.); RESONATOR SIEVE and GYRO SHIFTER (Tokuju Corporation); VIBRASONIC SYSTEM (manufactured by Dalton Corporation); SONIC CLEAN (manufactured by Sintokogio, Ltd.); TURBO-SCREENER (manufactured by Turbo Kogyo Co., Ltd.); MICRO SIFTER (manufactured by Makino Mfg. Co., Ltd.); and a circular vibrating screen.

A toner particle is produced, for example, as follows by a suspension polymerization method. For example, a styrene-based monomer and a (meth)acrylic acid ester-based monomer as polymerizable monomers that will form the binder resin, a colorant, a wax component, a polymerization initiator, and the like are homogenously dissolved or dispersed with a disperser such as a homogenizer, a ball mill, an ultrasonic disperser, or the like to prepare a polymerizable monomer composition. The polymerizable monomer composition is dispersed in an aqueous medium to granulate particles of the polymerizable monomer composition, and then the polymerizable monomers in the particles of the polymerizable monomer composition are polymerized to obtain a toner particle.

At this time, the polymerizable monomer composition is preferably prepared by mixing a dispersion liquid obtained by dispersing a colorant in the first polymerizable monomer (or some of the polymerizable monomers) with at least the second polymerizable monomer (or the rest of the polymerizable monomers). That is, the colorant can be made to be present in the polymer particle in a better dispersed state by sufficiently dispersing the colorant in the first polymerizable monomer and then mixing with the second polymerizable monomer together with other toner materials.

A toner particle is obtained by filtering, washing, drying and classifying the obtained polymer particles by known methods. A toner can be obtained by externally adding a silica fine particle to the toner particle obtained as described above.

The external addition of an external additive such as a silica fine particle to the toner particle can be performed by mixing the toner particle and the external additive with the following mixer. Examples of the mixer are presented hereinbelow. Henschel mixer (manufactured by Mitsui Mining Co., Ltd.); SUPERMIXER (manufactured by Kawata Mfg. Co., Ltd.); RIBOCONE (manufactured by Okawara Mfg. Co., Ltd.); NAUTA MIXER, TURBULIZER, and CYCLOMIX (manufactured by Hosokawa Micron Corporation); SPIRAL PIN MIXER (manufactured by Pacific Machinery & Engineering Co., Ldg.); and LÖDIGE MIXER (manufactured by Matsubo Corporation).

From the viewpoint of dispersibility of the external additive, the mixing time in the external addition step is preferably adjusted in the range of from 0.5 min to 10.0 min, more preferably adjusted in the range of from 1.0 min to 5.0 min. The method for producing a toner includes a step of obtaining a toner particle, a step of preparing a silica fine particle, and a step of externally adding the silica fine particle to and mixing with the obtained toner particle to obtain the toner.

Next, methods for measuring each physical property will be described.

Method for Calculating DSB, DSB-W, and D1/D by Solid-State $^{29}$Si-NMR DD/MAS Measurement of the Silica Fine Particle Solid-state $^{29}$Si-NMR measurement of the silica fine particle is performed by separating the silica fine particle from the toner surface. A method for separating the silica fine particle from the toner surface and the solid-state $^{29}$Si-NMR measurement will be described hereinbelow.

Method for Separating the Silica Fine Particle from Toner Surface

When the silica fine particle separated from the toner surface is used as a measurement sample, the silica fine particle is separated from the toner in the following procedure.

A total of 1.6 kg of sucrose (manufactured by Kishida Chemical Co., Ltd.) is added to 1 L of ion-exchanged water and dissolved under heating in a hot water bath to prepare a concentrated sucrose solution. A total of 31 g of the concentrated sucrose solution and 6 mL of CONTAMINON N (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) are placed in a centrifugation tube to prepare a dispersion liquid. The toner, 10 g, is added to this dispersion liquid, and lumps of the toner are loosened with a spatula or the like. The centrifugation tube is set in the "KM Shaker" (model: V. SX) manufactured by Iwaki Sangyo Co., Ltd. and shaken for 20 min at 350 reciprocations per minute. After shaking, the solution is transferred in a swing rotor glass tube (50 mL) and centrifuged under the conditions of 3500 rpm and 30 min in a centrifuge.

In the glass tube after centrifugation, toner particle is present in the uppermost layer, and an inorganic fine particle mixture containing a silica fine particle is present in the aqueous solution side of the lower layer. The aqueous solution of the upper layer and the aqueous solution of the lower layer are separated and dried to obtain a toner particle from the upper layer side and an inorganic fine particle mixture from the lower layer side. The obtained toner particle is used to measure the abundance ratio of the structure of Formula (9) described hereinbelow. The above centrifugation step is repeated so that the total amount of the inorganic fine particle mixture obtained from the lower layer side is 10 g or more.

Subsequently, 10 g of the resulting inorganic fine particle mixture is added to and dispersed in a dispersion liquid containing 100 mL of ion-exchanged water and 6 mL of CONTAMINON N. The resulting dispersion liquid is transferred to a swing rotor glass tube (50 mL) and centrifuged under the conditions of 3500 rpm and 30 min in a centrifuge. In the glass tube after centrifugation, the silica fine particle is present in the uppermost layer, and other inorganic fine particles are present in the aqueous solution side of the lower layer. The aqueous solution of the upper layer is collected, centrifugal separation is repeated as necessary, and after sufficient separation, the dispersion liquid is dried and the silica fine particle is collected.

Next, solid-state $^{29}$Si-NMR measurement of the silica fine particle recovered from the toner particle is performed under the measurement conditions shown hereinbelow.

DD/MAS Measurement Conditions for Solid-State $^{29}$Si-NMR Measurement

DD/MAS measurement conditions for solid-state $^{29}$Si-NMR measurement are as follows.

Device: JNM-ECX5002 (JEOL RESONANCE)
Temperature: room temperature
Measurement method: DD/MAS method $^{29}$Si 45°
Sample tube: zirconia 3.2 mmφ
Sample: filled in test tube in powder form
Sample rotation speed: 10 kHz
Relaxation delay: 180 s
Scan: 2000
Calibration standard material: DSS (sodium 3-(trimethylsilyl)-1-propanesulfonate)

After the above measurement, a plurality of silane components with different substituents and bonding groups are peak-separated into the following M unit, D unit, T unit, and Q unit by curve fitting from the solid-state $^{29}$Si-NMR spectrum of the silica fine particle.

Curve fitting is performed using JEOL JNM-EX400 software EXcalibur for Windows (registered trademark) version 4.2 (EX series). "1D Pro" is clicked from the menu icon to load the measurement data. Next, "Curve fitting function" is selected from "Command" on the menu bar to perform curve fitting. Curve fitting is performed for each component so that the difference (composite peak difference) between the composite peak obtained by combining the peaks obtained by curve fitting and the peak of the measurement result is minimized.

M unit:$(R_i)(R_j)(R_k)SiO_{1/2}$ Formula (4)

D unit:$(R_g)(R_h)Si(O_{1/2})_2$Formula (5)

T unit:$R_mSi(O_{1/2})_3$Formula (6)

Q unit:$Si(O_{1/2})_4$Formula (7)

$R_i$, $R_j$, $R_k$, $R_g$, $R_h$, and $R_m$ in the Formulas (4), (5), and (6) are each an alkyl group such as a hydrocarbon group having from 1 to 6 carbon atoms, a halogen atom, a hydroxy group, an acetoxy group, an alkoxy group, or the like bonded to silicon.

Further, for the D unit peak, waveform separation is performed individually using the Voigt function, and the area of the peak D1 in the range of more than −19 ppm to not more than −17 ppm is calculated. After peak separation, the integrated value of D units present in the chemical shift range of from −25 to −15 ppm, and the sum S of all the integrated values of M, D, T, and Q units present in the range of from −140 to 100 ppm are calculated, the BET specific surface area B (m$^2$/g) of the silica fine particle is obtained by the method described hereinbelow, and the ratio (D/S)/B is calculated. Also, the ratio D1/D is calculated from the integrated values of the peaks D1 and D obtained by waveform separation.

Furthermore, after the operation of washing the silica fine particle with chloroform is performed as shown below, the same NMR measurement is performed to calculate (D/S)/B after washing.

Washing Silica Fine Particle with Chloroform

A total of 100 mL of chloroform and 1 g of silica fine particle are placed into a centrifuge tube and stirred with a spatula or the like. The tube for centrifugation is set on the KM Shaker and shaken for 20 min at 350 reciprocations per minute. After shaking, the mixture is transferred to a swing rotor glass tube and centrifuged under the conditions of 3500 rpm and 30 min in a centrifuge. The supernatant is discarded, 100 mL of chloroform is added again, and shaking and centrifugation are performed twice. Precipitated silica fine particle is collected and vacuum-dried at 40° C. for 24 h to obtain a washed silica fine particle.

Method for Measuring Fragment Ions on Silica Fine Particle Surface by Time-of-Flight Secondary Ion Mass Spectrometry (TOF-SIMS)

TOF-SIMS measurement of silica fine particle is performed using the silica fine particle separated from the toner by the above-described method for separating silica fine particle from the toner surface. TRIFT-IV manufactured by ULVAC-PHI, Inc. is used for fragment ion measurement of silica fine particle surface using TOF-SIMS.

The analysis conditions are as follows.

Sample preparation: silica microparticles are caused to adhere to an indium sheet
Primary ion: Au ion.
Accelerating voltage: 30 kV.
Charge neutralization mode: On.
Measurement mode: Positive.
Raster: 200 μm.
Measurement time: 60 s.

Whether fragment ions corresponding to the structure represented by Formula (1) are observed is confirmed from the obtained mass profile of secondary ion mass/secondary ion charge number (m/z). For example, where the surface treatment agent is polydimethylsiloxane or cyclic siloxane, fragment ions are observed at m/z=147, 207, and 221 positions.

Monomer Analysis Method for Vinyl Resin Components

Separation of Resin Component from Toner

The toner is dissolved in tetrahydrofuran (THF), and the solvent is distilled off from the resulting soluble matter under reduced pressure to obtain the tetrahydrofuran (THF) soluble component of the toner. The obtained tetrahydrofuran (THF) soluble component of the toner is dissolved in chloroform to prepare a sample solution having a concentration of 25 mg/mL. A total of 3.5 mL of the obtained sample solution is injected into the below-described device, and a low-molecular-weight component derived from a release agent and having a molecular weight of less than 2000 and a high-molecular-weight component derived from a resin component and having a molecular weight of 2000 or more are separated under the following conditions.

Preparative GPC device: Preparative HPLC LC-980 type manufactured by Japan Analytical Industry Co., Ltd.

Preparative column: JAIGEL 3H, JAIGEL 5H (manufactured by Japan Analytical Industry Co., Ltd.)

Eluent: chloroform.

Flow rate: 3.5 mL/min.

After separating the high-molecular-weight component derived from the resin component, the solvent is distilled off under reduced pressure, and drying is further performed for 24 h in an atmosphere of 90° C. under reduced pressure. When a high-molecular-weight component other than the vinyl resin is present, it can be determined whether this component is a vinyl resin by conducting a monomer analysis of the vinyl resin described below. The above operation is repeated until about 100 mg of vinyl resin is obtained. The obtained vinyl resin is dried for 24 h under reduced pressure at 40° C.

Monomer Analysis of Vinyl Resin Components

For the type of monomer of the vinyl resin component, samples of each resin component separated from the toner are analyzed using a pyrolysis GC/MS device under the following conditions.

Measuring device: "Voyager" (trade name, manufactured by Thermo Electron Co., Ltd.).

Pyrolysis temperature: 600° C.

Column: HP-1 (15 m×0.25 mm×0.25 μm).

Inlet: 300° C., Split: 20.0.

Injection volume: 1.2 mL/min.

Temperature rise: 50° C. (4 min)-300° C. (20° C./min).

Confirmation of Vinyl Resin Having Structure Represented by Formula (9) on Toner Particle Surface by Time-of-Flight Secondary Ion Mass Spectrometry (TOF-SIMS) and Method for Measuring Sa The TOF-SIMS measurement of the toner particle surface is performed using the toner particle from which the silica fine particle has been removed by the above-described method for separating the silica fine particle from the toner surface.

For fragment ion measurement of silica fine particle surface using TOF-SIMS, TRIFT-IV manufactured by ULVAC-PHI, Inc. is used.

Analysis conditions are as follows.

Sample preparation: toner particles are caused to adhere to an indium sheet.

Primary ion: Au ion.

Accelerating voltage: 30 kV.

Charge neutralization mode: On.

Measurement mode: Positive.

Raster: 200 μm.

Measurement time: 60 s.

From the obtained secondary ion mass/secondary ion charge number (m/z) mass profile, it is checked whether fragment ions of the monomer species identified by the above monomer analysis and fragment ions based on the structure represented by Formula (9) are observed.

A polymethyl methacrylate (PMMA) film is measured under the above conditions, and the total sum A of peak intensities corresponding to the structure of Formula (9) obtained at that time is obtained. After that, the same measurement is performed using the toner particle from which the silica fine particle has been removed, and the peak intensity B corresponding to the structure represented by Formula (9) is obtained. For B, an arithmetic average value measured for 100 toner particles is used. Sa can be calculated by the following formula.

$$Sa=B/A\times100(\%).$$

As for determining whether the vinyl resin having the structure represented by Formula (9) is present on the surface of the toner particle, where the fragment ions of the monomer species identified by the above monomer analysis and the fragment having Formula (9) are observed, it is determined that the vinyl resin having the structure represented by Formula (9) is present on the surface of the toner particle.

Method for Measuring Si—OH Content of the Silica Fine Particle

The amount of Si—OH in the silica fine particle can be determined by the following method using the silica fine particle separated from the toner by the method for separating the silica fine particle from the toner surface described above.

A sample liquid 1 is prepared by mixing 25.0 g of ethanol and 75.0 g of a 20% by mass sodium chloride aqueous solution. Further, 2.00 g of silica fine particles are accurately weighed in a glass bottle, and a sample liquid 2 is prepared by adding a solvent obtained by mixing 25.0 g of ethanol and 75.0 g of a 20% by mass sodium chloride aqueous solution. The sample liquid 2 is stirred with a magnetic stirrer for 5 min or longer to disperse the silica fine particles. Then, the pH change of each of sample liquids 1 and 2 is measured while dropping 0.1 mol/L sodium hydroxide aqueous solution at 0.01 mL/min. The titer (L) of sodium hydroxide aqueous solution when pH 9.0 is reached is recorded. The amount Sn (/$nm^2$) of Si—OH per 1 $nm^2$ can be calculated from the following formula.

$$Sn=\{(a-b)\times c\times NA\}/(d\times e) \quad (10)$$

a: NaOH titer (L) of sample liquid 2.

b: NaOH titer (L) of sample liquid 1.

c: concentration of NaOH solution used for titration (mol/L).

NA: Avogadro's number.

d: mass of silica fine particle (g).

e: BET specific surface area of silica fine particle ($nm^2$/g: converted from the specific surface area ($m^2$/g) obtained below).

Method for Measuring BET Specific Surface Area of Silica Fine Particle

The BET specific surface area of the silica fine particle is measured by the following procedure. As a measuring device, "Automatic Specific Surface Area/Pore Size Distribution Measuring Device TriStar 3000 (manufactured by Shimadzu Corporation)", which adopts a gas adsorption method based on a constant volume method as a measuring method, is used. Setting of measurement conditions and analysis of measurement data are performed using the dedicated software "TriStar 3000 Version 4.00" provided with the device. A vacuum pump, a nitrogen gas pipe, and a helium gas pipe are connected to the device. Using nitrogen gas as the adsorption gas, the value calculated by the BET multipoint method is defined as the BET specific surface area.

The BET specific surface area is calculated as follows. First, nitrogen gas is adsorbed on the silica fine particle, and the equilibrium pressure P (Pa) in the sample cell at that time and the nitrogen adsorption amount $V_a$ (mol·$g^{-1}$) of the magnetic bodies are measured. Then, an adsorption isotherm is obtained in which a relative pressure $P_r$, which is the value obtained by dividing the equilibrium pressure P (Pa) in the sample cell by the saturated vapor pressure $P_0$ (Pa) of nitrogen, is plotted against the abscissa, and the nitrogen adsorption amount $V_a$ ($mol \cdot g^{-1}$) is plotted against the ordinate. Next, a monomolecular layer adsorption amount $V_m$ ($mol \cdot g^{-1}$), which is an adsorption amount necessary to form a monomolecular layer on the surface of the silica fine particle, is obtained by using the following BET formula.

$$P_r/V_a(1-P_r)=1/(V_m \times C)+(C-1)\times P_r/(V_m \times C)$$

(Here, C is a BET parameter, which is a variable that varies depending on the type of measurement sample, the type of adsorbed gas, and the adsorption temperature.)

Where $P_r$ is the X-axis and $P_r/V_a$ $(1-P_r)$ is the γ-axis, the BET formula can be interpreted as a straight line with a slope of $(C-1)/(V_m \times C)$ and an intercept of $1/(V_m \times C)$ (this straight line is called a BET plot).

Slope of straight line=$(C-1)/(V_m \times C)$.

Intercept of straight line=$1/(V_m \times C)$.

By plotting the measured values of $P_r$ and the measured values of $P_r/V_a$ $(1-P_r)$ on a graph and drawing a straight line by using the least squares method, the values of slope and intercept of the straight line can be calculated. Using these values, $V_m$ and C can be calculated by solving the simultaneous equations for the slope and the intercept. Further, the BET specific surface area S ($m^2/g$) of the silica fine particle is calculated based on the following formula from the $V_m$ calculated above and the cross-sectional area occupied by the nitrogen molecule (0.162 $nm^2$).

$$S=V_m \times N \times 0.162\times 10^{-18}$$

(Here, N is Avogadro's number (mol-1)).

Specifically, measurements using this device are performed according to the following procedure.

The tare of a well-washed and dried dedicated glass sample cell (stem diameter ⅜ inch, volume 5 mL) is accurately weighed. Then, using a funnel, 0.1 g of silica fine particle is placed into this sample cell. The sample cell containing silica fine particle is set in a "PRETREATMENT DEVICE VACUUM PREP 061 (manufactured by Shimadzu Corporation)" to which a vacuum pump and a nitrogen gas pipe are connected, and vacuum degassing is continued at 23° C. for 10 h. The vacuum degassing is gradually performed while adjusting a valve so that the silica fine particle is not sucked into the vacuum pump. The pressure inside the cell gradually decreases in the course of degassing and finally reaches 0.4 Pa (about 3 mTorr). After the vacuum degassing is completed, nitrogen gas is gradually injected to return the inside of the sample cell to atmospheric pressure, and the sample cell is detached from the pretreatment device. The mass of the sample cell is accurately weighed, and the exact mass of the silica fine particle is calculated from the difference from the tare. At this time, the sample cell is covered with a rubber plug during weighing so that the silica fine particle in the sample cell is not contaminated with moisture in the atmosphere.

Next, a dedicated isothermal jacket is attached to the sample cell containing the silica fine particle. A dedicated filler rod is inserted into this sample cell, and the sample cell is set in the analysis port of the device. The isothermal jacket is a cylindrical member with the inner surface made of a porous material and the outer surface made of an impermeable material. The isothermal jacket can suck up liquid nitrogen to a certain level by capillary action. Next, a free space of the sample cell, including the connecting device is measured. The free space is calculated by measuring the volume of the sample cell by using helium gas at 23° C., then measuring the volume of the sample cell after cooling the sample cell with liquid nitrogen by similarly using helium gas, and converting from the difference in volume. In addition, the saturated vapor pressure $P_0$ (Pa) of nitrogen is separately and automatically measured using a $P_0$ tube built into the device.

Next, after the inside of the sample cell is vacuum degassed, the sample cell is cooled with liquid nitrogen while vacuum degassing is continued. Thereafter, nitrogen gas is introduced stepwise into the sample cell to cause the silica fine particle to adsorb nitrogen molecules. At this time, since an adsorption isotherm can be obtained by measuring the equilibrium pressure P (Pa) at any time, this adsorption isotherm is converted into a BET plot. The points of the relative pressure $P_r$ for collecting data are set to a total of 6 points of 0.05, 0.10, 0.15, 0.20, 0.25, and 0.30. A straight line is drawn on the obtained measurement data by the least squares method, and $V_m$ is calculated from the slope and intercept of the straight line. Further, using this $V_m$ value, the BET specific surface area of the silica fine particle is calculated as described above.

Method for Calculating Coverage Ssi of Surface of Toner Particle by Silica Fine Particle The coverage Ssi of the toner particle surface by the silica fine particle is calculated from a backscattered electron image acquired by observation with a scanning electron microscope (SEM). A backscattered electron image is also called a "composition image", and the smaller the atomic number, the darker the detected image, and the larger the atomic number, the brighter the detected image. The backscattered electron image of the toner is acquired under the following observation conditions. A method for acquiring a backscattered electron image of the toner and a method for calculating the coverage of the toner particle surface by the silica fine particle are described hereinbelow.

Method for Acquiring Backscattered Electron Image of Toner

Apparatus used: ULTRA PLUS, manufactured by Carl Zeiss Microscopy Co., Ltd.
Accelerating voltage: 1.0 kV.
WD: 2.5 mm.
Aperture size: 30.0 μm.
Detection signal: EsB (energy selective backscattered electron).
EsB Grid: 700V.
Observation magnification: 20,000 times.
Contrast: 63.0±5.0% (reference value).
Brightness: 38.0±5.0% (reference value).
Resolution: 1024×768 pixels.
Pretreatment: toner is sprinkled on carbon tape (no Pt vapor deposition).

Contrast and brightness are set, as appropriate, according to the state of the apparatus used. In addition, the accelerating voltage and EsB Grid are set so as to achieve items such as acquisition of structural information on the outermost surface of the toner, prevention of charge-up of an undeposited sample, and selective detection of high-energy backscattered electrons. For the observation field of view, a portion where the curvature of the toner is small is selected.

Method for Calculating Silica Coverage of Toner

The silica coverage is acquired by analyzing the backscattered electron image of the toner outermost surface obtained by the above method using image processing software ImageJ (developed by Wayne Rashand). The procedure is shown below.

First, the backscattered electron image to be analyzed is converted to 8-bit from Type in the Image menu. Next, from Filters in the Process menu, the median diameter is set to 2.0 pixels to reduce image noise. Next, the entire backscattered electron image is selected using the Rectangle Tool on the toolbar. Subsequently, Threshold is selected from Adjust in the Image menu, and a luminance threshold (from 85 to 128 (256 gradations)) is specified so that only luminance pixels derived from the silica fine particle in backscattered electrons are selected. Finally, Measure is selected from the Analyze menu, and the value of the area ratio (% by area) of the luminance selected portion in the backscattered electron image is calculated. The above procedure is performed for 20 fields of view for the toner to be evaluated, and the arithmetic average value is taken as the coverage Ssi of the toner particle surface by the silica fine particle.

Method for Measuring Number-Average Particle Diameter of Silica Fine Particle

The number-average particle diameter of the silica fine particle is measured from a secondary electron image acquired by observing the toner surface with a scanning electron microscope (SEM).

Method for Acquiring Secondary Electron Image of Toner

Apparatus used: ULTRA PLUS, manufactured by Carl Zeiss Microscopy Co., Ltd.

Accelerating voltage: 1.0 kV.

WD: 2.5 mm.

Aperture size: 30.0 μm.

Detection signal: SE2 (secondary electron image).

Observation magnification: 50,000 times.

Resolution: 1024×768 pixels.

Pretreatment: toner is sprinkled on carbon tape (no Pt vapor deposition).

The maximum diameter of 100 primary particles of a silica fine particle on the toner particle surface is measured from the resulting secondary electron image, and the average value is taken as the number-average particle diameter of the silica particle. The silica fine particle and the strontium titanate fine particle are distinguished by elemental mapping with SEM-EDX.

Method for Measuring C Amount in the Silica Fine Particle

The C amount (carbon amount) in the silica fine particle which is derived from the hydrophobizing agent is measured using a carbon/sulfur analyzer (trade name: EMIA-320) manufactured by HORIBA.

A total of 0.3 g of silica fine particle as a sample is accurately weighed and put it into a crucible for the carbon/sulfur analyzer. To this, 0.3 g±0.05 g of tin (supplementary item number 9052012500) and 1.5 g±0.1 g of tungsten (supplementary item number 9051104100) are added as combustion improvers. After that, the silica fine particle is heated at 1100° C. in an oxygen atmosphere according to the instruction manual provided with the carbon/sulfur analyzer. As a result, the hydrophobic groups derived from the hydrophobizing agent on the surface of the silica fine particle are thermally decomposed into $CO_2$, and the amount thereof is measured. The C amount (% by mass) contained in the silica fine particle is determined from the obtained amount of $CO_2$.

Calculation of C Amount Immobilization Rate of the Silica Fine Particle Washing with Chloroform: Extraction of Non-Immobilized Treatment Agent A silica fine particle separated from the toner by the method for separating a silica fine particle from the toner surface described above can be used.

A total of 0.50 g of silica fine particles and 40 mL of chloroform are placed into an Erlenmeyer flask, covered with a lid, and stirred (magnetic stirrer) for 2 h. After that, the stirring is stopped, and the mixture is allowed to stand for 12 h. Then centrifuging is performed, and the entire supernatant is removed. A centrifuge manufactured by Kokusan Corp. (trade name: H-9R) is used, the centrifugation is performed using a Bn1 rotor and a plastic centrifuge tube for the Bn1 rotor and under the conditions of 20° C., 10000 rpm, and 5 min.

The centrifuged silica fine particle is placed into the Erlenmeyer flask again, 40 mL of chloroform is added, a lid is placed, and stirring is performed (magnetic stirrer) for 2 h. After that, the stirring is stopped, and the mixture is allowed to stand for 12 h. Then centrifuging is performed to remove all supernatant. This operation is repeated two more times. Then, the obtained sample is dried at 50° C. for 2 h using a thermostat. Further, chloroform is sufficiently volatilized by reducing the pressure to 0.07 MPa and drying at 50° C. for 24 h.

Measurement of C Amount

The C amount in the silica fine particle washed with chloroform as described above and the C amount in the silica fine particle before washing with chloroform are measured according to the above "Method for Measuring C Amount in the Silica Fine Particle". The C amount immobilization rate of the silica fine particle can be calculated by the following formula.

$$\text{C amount immobilization rate}[\%]=[(\text{C amount in silica fine particle treated with chloroform})/(\text{C amount in silica fine particle before washing with chloroform})]\times 100$$

Method for Measuring Weight-Average Particle Diameter (D4) of Toner

The weight-average particle diameter (D4) of the toner is calculated by using a precision particle diameter distribution measuring device "Coulter Counter Multisizer 3" (registered trademark, manufactured by Beckman Coulter, Inc.), which is based on a pore electrical resistance method and equipped with a 100 μm aperture tube, and dedicated software "Beckman Coulter Multisizer 3 Version 3.51" (manufactured by Beckman Coulter, Inc.) provided therewith for setting measurement conditions and analyzing the measurement data, performing measurements at the number of effective measurement channels of 25,000 and analyzing the measurement data. For the electrolytic aqueous solution used for measurement, a solution in which special grade sodium chloride is dissolved in ion-exchanged water so that the concentration is about 1% by mass, for example, "ISOTON II" (manufactured by Beckman Coulter, Inc.) can be used. Before performing the measurement and analysis, the dedicated software is set as follows.

At the "Change Standard Measurement Method (SOM) Screen" of the dedicated software, the total number of counts in control mode is set to 50,000 particles, the number of measurements is set to 1, and a value obtained using "Standard Particle 10.0 μm" (manufactured by Beckman Coulter Co., Ltd.) is set as the Kd value. The threshold and noise level are automatically set by pressing the threshold/noise level measurement button. Also, the current is set to 1600 HA, the gain is set to 2, the electrolytic solution is set to ISOTON II, and the flash of aperture tube after measurement is checked. At the "Pulse to Particle Diameter Conversion Setting Screen" of the dedicated software, the bin interval is set to logarithmic particle diameter, the particle diameter bin is set to a 256 particle diameter bin, and the particle diameter range is set to from 2 μm to 60 μm.

The specific measurement method is as follows.

(1) About 200 ml of the electrolytic aqueous solution is placed in a 250 ml round-bottom glass beaker exclusively provided for Multisizer 3, the beaker is set on a sample stand, and a stirrer rod is stirred counterclockwise at 24 revolutions/second. Then, the dirt and air bubbles inside the aperture tube are removed using the "Flush Aperture Tube" function of the dedicated software.

(2) About 30 ml of the electrolytic aqueous solution is placed in a 100 ml flat-bottomed glass beaker, and about 0.3 ml of a diluent obtained by 3-fold by mass dilution of "CONTAMINON N" (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) as a dispersing agent with ion-exchanged water is added thereto.

(3) A predetermined amount of ion-exchanged water is placed in a water tank of an ultrasonic disperser "Ultrasonic Dispersion System Tetora 150" (manufactured by Nikkaki Bios Co., Ltd.) having an electrical output of 120 W and containing two oscillators with an oscillation frequency of 50 kHz that are built in with a phase shift of 180 degrees, and about 2 ml of the CONTAMINON N is added to the water tank.

(4) The beaker of (2) is set in the beaker fixing hole of the ultrasonic disperser and the ultrasonic disperser is operated. The height position of the beaker is adjusted so that the resonance state of the liquid level of the electrolytic aqueous solution in the beaker is maximized.

(5) While the electrolytic aqueous solution in the beaker in (4) above is being irradiated with ultrasonic waves, about 10 mg of toner is added little by little to the electrolytic aqueous solution and dispersed. Then, the ultrasonic dispersion treatment is continued for another 60 sec. In the ultrasonic dispersion, the temperature of water in the water tank is appropriately adjusted to from 10° C. to 40° C.

(6) The electrolytic aqueous solution of (5) in which the toner is dispersed is dropped using a pipette into the round-bottomed beaker of (1) installed in the sample stand, and the measured concentration is adjusted to about 5%. The measurement is continued until the number of measured particles reaches 50,000.

(7) The measurement data are analyzed with the dedicated software provided with the device, and the weight-average particle diameter (D4) is calculated. The weight-average particle diameter (D4) is the "average diameter" on the analysis/volume statistics (arithmetic mean) screen when graph/vol % is set using the dedicated software.

Method for Measuring Content Ratio of the Silica Fine Particle and Strontium Titanate The value (Si/Sr) of the ratio of the content of the silica fine particle to the content of strontium titanate fine particle in the toner is measured and calculated by X-ray fluorescence analysis (XRF). The toner is pelletized by the below-described press molding to obtain a sample, and the Si atoms derived from the silica fine particle to be analyzed and the Sr atoms inherent to the strontium titanate fine particle are quantified by the wavelength dispersive fluorescent X-rays described hereinbelow.

(i) Example of Equipment Used

Fluorescent X-ray analyzer 3080 (Rigaku Corporation).

(ii) Sample Preparation

A sample press molding machine of MAEKAWA Testing Machine (manufactured by MAYEKAWA Mfg. Co., Ltd.) is used for sample preparation. A total of 0.5 g of toner is placed in an aluminum ring (model number: 3481E1), set to a load of 5.0 tons, and pressed for 1 min to pelletize.

(iii) Measurement Conditions

Measurement diameter: 10φ.
Measurement potential, voltage 50 kV, from 50 mA to 70 mA 2θ angle: 25.12°.
Crystal plate: LiF.
Measurement time: 60 sec.

(iv) Derivation of Si Element Intensity Ratio Derived from the Silica Fine Particle In order to calculate the proportion of Si element intensity derived from the silica fine particle in the Si element intensity of the toner to be analyzed, the same measurement is performed on the toner particle from which the silica fine particle on the toner surface have been separated by the method described above.

Si element intensity ratio derived from the silica fine particle=[(Si element intensity before silica separation)−(Si element intensity after silica separation)]/(Si element intensity before silica separation).

(v) Method for Calculating the Content Ratio of the Silica Fine Particle and the Strontium Titanate Particle Content ratio of the silica fine particle and the strontium titanate particle (Si/Sr)=(Si element intensity)×(Si element intensity derived from the silica fine particle)/(Sr element intensity).

EXAMPLES

Although the disclosure will be described in more detail below with production examples and examples, these are not intended to limit the invention in any way. All parts in the following formulations are parts by mass.

Production Example of Silica Fine Particle 1

Untreated dry silica as small-diameter inorganic fine particle (number-average particle diameter of primary particle 15 nm, BET specific surface area 200 $m^2/g$) and untreated dry silica as large-diameter inorganic fine particle (number-average particle diameter of primary particle is 35 nm, BET specific surface area 50 $m^2/g$) were loaded at a mass ratio of 10:1 and heated to 330° C. in a fluidized state created by stirring. The inside of the reactor was replaced with nitrogen gas, the reactor was sealed, and octamethylcyclotetrasiloxane was sprayed and mixed as a first surface treatment agent by using a spray nozzle until the gauge pressure reached 200 kPa. Thereafter, the reaction was conducted by continuing heating and stirring for 1 h to carry out a coating treatment. After the treatment, the inside of the reaction system was replaced with a nitrogen atmosphere and heated to 330° C. again. Subsequently, as a second surface treatment agent, 10 parts of dimethyl silicone oil (KF-96-50CS, manufactured by Shin-Etsu Chemical Co., Ltd.) was sprayed on 100 parts of untreated dry silica, and then the coating treatment was similarly carried out for 1 h to obtain silica fine particle 1. Table 1 shows the physical properties of the silica fine particle 1.

Production Examples of Silica Fine Particles 2 to 6

Silica fine particles 2 to 6 were obtained in the same manner as in the production example of silica fine particle 1, except that the reaction time of the first surface treatment agent and the number of parts of the second surface treatment agent were changed as shown in Table 1. Regarding the structure of the second treatment component in Table 1, the structure of the substituent of the compound represented by Formula (3) is shown.

Production Example of Silica Fine Particle 7

Silica fine particle 7 were obtained in the same manner as in the production example of silica fine particle 1, except that untreated dry silica as small-diameter inorganic fine particle (number-average particle diameter of primary particle 15 nm, BET specific surface area 200 $m^2/g$) and untreated dry silica as large-diameter inorganic fine particle (number-average particle diameter of primary particle 35 nm, BET specific surface area 50 $m^2/g$) were loaded at a mass ratio of 6:1.

Production Example of Silica Fine Particle 8

Silica fine particle 8 were obtained in the same manner as in the production example of silica fine particle 1, except that only untreated dry silica (number-average particle diameter of primary particle 15 nm, BET specific surface area 200 $m^2/g$) was loaded as inorganic fine particle.

Production Examples of Silica Fine Particles 9 to 15

Silica fine particles 9 to 15 were obtained in the same manner as in the production example of silica fine particle 1, except that carbinol-modified silicone oil (KF-6002, manufactured by Shin-Etsu Chemical Co., Ltd.) was used as the second surface treatment agent, and the BET specific surface area of the loaded untreated dry silica, the reaction time of the first surface treatment agent, and the number of parts of the second surface treatment agent were changed as shown in Table 1.

Production Example of Silica Fine Particle 16

Untreated dry silica (number-average particle diameter of primary particle 15 nm, BET specific surface area 200 $m^2/g$) was loaded as inorganic fine particle and heated to 290° C. in a fluidized state created by stirring. The inside of the reactor was replaced with nitrogen gas, the reactor was sealed, and octamethylcyclotetrasiloxane was sprayed and mixed as the first surface treatment agent by using a spray nozzle until the gauge pressure reached 100 kPa. Thereafter, the reaction was conducted by continuing heating and stirring for 1 h to carry out a coating treatment. After the treatment, the inside of the reaction system was replaced with a nitrogen atmosphere and heated to 290° C. again. Subsequently, as the second surface treatment agent, 15 parts of dimethyl silicone oil (KF-96-50CS, manufactured by Shin-Etsu Chemical Co., Ltd.) was sprayed on 100 parts of untreated dry silica, and then the coating treatment was similarly carried out for 1 h to obtain silica fine particle 16.

Production Example of Silica Fine Particle 17

Untreated dry silica (number-average particle diameter of primary particle 15 nm, BET specific surface area 200 $m^2/g$) was loaded as inorganic fine particle and heated to 250° C. in a fluidized state created by stirring. The inside of the reactor was replaced with nitrogen gas, the reactor was sealed, and octamethylcyclotetrasiloxane was sprayed and mixed as a first surface treatment agent by using a spray nozzle until the gauge pressure reached 100 kPa. Thereafter, the reaction was conducted by continuing heating and stirring for 1 h to carry out a coating treatment and obtain silica fine particle 17.

Production Example of Silica Fine Particle 18

Untreated dry silica (number-average particle diameter of primary particle 15 nm, BET specific surface area 200 $m^2/g$) was loaded as inorganic fine particle and heated to 250° C. in a fluidized state created by stirring. The inside of the reactor was replaced with nitrogen gas, the reactor was sealed, 30 parts of dimethyl silicone oil (KF-96-50CS, manufactured by Shin-Etsu Chemical Co., Ltd.) was sprayed on 100 parts of untreated dry silica while continuing stirring and keeping the temperature to maintain the fluidized state of silica, and the coating treatment was carried out for 1 h to obtain silica fine particle 18.

Production Example of Silica Fine Particles 19 and 20

Silica fine particle 19 and 20 were obtained in the same manner as in the production example of silica fine particle 15, except that the number of parts of dimethyl silicone oil and the treatment temperature were changed as shown in Table 1.

Production Example of Silica Fine Particle 21

Untreated dry silica (number-average particle diameter of primary particle 15 nm, BET specific surface area 200 $m^2/g$) was loaded as inorganic fine particle and heated to 250° C. in a fluidized state created by stirring. The inside of the reactor was replaced with nitrogen gas, the reactor was sealed, and 25 parts of hexamethyldisilazane was sprayed as the first surface treatment agent by using a spray nozzle. Thereafter, the reaction was conducted by continuing heating and stirring for 1 h to carry out a coating treatment. After the treatment, the inside of the reaction system was replaced with a nitrogen atmosphere and heated to 250° C. again. Subsequently, 10 parts of dimethyl silicone oil (KF-96-50CS, manufactured by Shin-Etsu Chemical Co., Ltd.) was sprayed as the second surface treatment agent on 100 parts of untreated dry silica, and then the coating treatment was similarly carried out for 1 h to obtain silica fine particle 21.

Production Example of Silica Fine Particle 22

Untreated dry silica (number-average particle diameter of primary particle 15 nm, BET specific surface area 200 $m^2/g$) was loaded as inorganic fine particle and heated to 250° C.

in a fluidized state created by stirring. The inside of the reactor was replaced with nitrogen gas, the reactor was sealed, and 25 parts of hexamethyldisilazane was sprayed as the first surface treatment agent onto 100 parts of untreated dry silica by using a spray nozzle. Thereafter, the reaction was conducted by continuing heating and stirring for 1 h to carry out a coating treatment and obtain silica fine particle 22. Production Example of Magnetic Iron Oxide A total of 55 liters of 4.0 mol/L sodium hydroxide aqueous solution was mixed and stirred with 50 liters of ferrous sulfate aqueous solution containing 2.0 mol/L of $Fe^{2+}$ to obtain a ferrous salt aqueous solution containing ferrous hydroxide colloid. This aqueous solution was kept at 85° C. and an oxidation reaction was carried out while blowing the air at 20 L/min to obtain a slurry containing core particles.

After filtering and washing the resulting slurry with a filter press, the core particles were redispersed in water and reslurried. To this reslurry liquid, sodium silicate was added to obtain 0.20% by mass in terms of silicon per 100 parts by mass of the core particles, the pH of the slurry liquid was adjusted to 6.0, and stirring was performed to obtain magnetic iron oxide particles having a silicon-rich surface. The resulting slurry was filtered by a filter press, washed, and reslurried with deionized water. A total of 500 g (10% by mass relative to magnetic iron oxide) of ion exchange resin SK110 (manufactured by Mitsubishi Chemical Corporation) was added to this reslurry liquid (solid content: 50 g/L), and ion exchange was performed by stirring for 2 h. Thereafter, the ion exchange resin was removed by filtration through a mesh, filtering and washing were performed with a filter press, and drying and pulverization were carried out to obtain magnetic iron oxide having a number-average diameter of 0.23 μm.

Production of Silane Compound

A total of 30 parts of iso-butyltrimethoxysilane was added dropwise to 70 parts of ion-exchanged water while stirring. Thereafter, this aqueous solution was maintained at pH 5.5 and temperature 55° C., and hydrolyzed by dispersing for 120 min at a peripheral speed of 0.46 m/s by using a disper blade. After that, the pH of the aqueous solution was adjusted to 7.0, and the hydrolysis reaction was stopped by cooling to 10° C. An aqueous solution containing a silane compound was thus obtained.

Production of Magnetic Body 1

A total of 100 parts of magnetic iron oxide was placed in a high-speed mixer (Model LFS-2, manufactured by Fukae Powtech Co., Ltd.), and 8.0 parts of an aqueous solution containing the silane compound was added dropwise over 2 min while stirring at a rotation speed of 2000 rpm. After that, mixing and stirring were conducted for 5 min. Next, in order to increase the adhesion of the silane compound, drying was performed at 40° C. for 1 h to reduce the water content, and then the mixture was dried at 110° C. for 3 h to advance the condensation reaction of the silane compound. After that, a magnetic body 1 was obtained through pulverization and sieving through a sieve with an opening of 100 μm.

Production Example of Magnetic Body 2

A caustic soda solution in an equivalent of from 1.00 to 1.10 with respect to iron element, $P_2O_5$ in an amount that is 0.15% by mass in terms of phosphorus element with respect to iron element, and $SiO_2$ in an amount that is 1.50% by mass in terms of silicon element with respect to iron element were mixed in a ferrous sulfate aqueous solution to prepare an aqueous solution containing ferrous hydroxide. The pH of the aqueous solution was adjusted to 8.0, and an oxidation reaction was carried out at 85° C. while blowing air into the solution to prepare a slurry liquid containing seed crystals.

Next, an aqueous solution of ferrous sulfate was added to the slurry liquid to obtain an equivalent of from 0.90 to 1.20 with respect to the initial amount of alkali (sodium component of caustic soda), the slurry liquid was maintained at pH 7.6, the oxidation reaction was proceeded while blowing air, and a slurry liquid containing iron oxide was obtained. The generated magnetic iron oxide particles were filtered by a filter press, washed with a large amount of water, and then dried at 120° C. for 2 h. The obtained particles were pulverized to obtain a magnetic body 2 having a volume average particle diameter of 150 nm.

Production Example of Sulfonic Acid Group-Containing Resin

A total of 250 parts of methanol, 150 parts of 2-butanone and 100 parts of 2-propanol as solvents and 83 parts of styrene, 10 parts of 2-ethylhexyl acrylate, and 7 parts of 2-acrylamido-2-methylpropanesulfonic acid as monomers were placed in a pressurizable reaction vessel equipped with a reflux tube, a stirrer, a thermometer, a nitrogen introduction tube, a dropping device and a pressure reducing device and heating was performed to a reflux temperature while stirring. A solution prepared by diluting 3 parts of 2,2'-azobis (2-methylbutyronitrile), which is a polymerization initiator, with 20 parts of 2-butanone was added dropwise over 30 min, stirring was continued for 5 h, then a solution prepared by diluting 1 part of 2,2'-azobis(2-methylbutyronitrile) with 20 parts of 2-butanone was added dropwise over 30 min, and stirring was further conducted for 5 h to complete the polymerization. The polymer obtained after distilling off the polymerization solvent under reduced pressure was coarsely pulverized to 100 μm or less using a cutter mill equipped with a 150-mesh screen. The resulting sulfonic acid group-containing resin had a Tg of about 75° C.

Production Example of Toner Particle 1

The toner particle were produced by the following procedure.

Preparation of First Aqueous Medium

A total of 2.9 parts of sodium phosphate dodecahydrate was added to 353.8 parts of ion-exchanged water, heating to 60° C. was performed while stirring using a TK HOMOMIXER (manufactured by Tokushu Kika Kogyo Co., Ltd.), and then an aqueous calcium chloride solution prepared by adding 1.7 parts of calcium chloride dihydrate to 11.7 parts of ion-exchanged water and an aqueous magnesium chloride solution prepared by adding 0.5 parts of magnesium chloride to 15.0 parts of ion-exchanged water were added and stirring was performed to obtain a first aqueous medium containing a dispersion stabilizer.

Preparation of Polymerizable Monomer Composition

Styrene 75.0 parts
n-Butyl acrylate 25.0 parts
1,6-Hexanediol diacrylate 0.5 parts
Magnetic body 1 95.0 parts
Sulfonic acid group-containing resin 1.0 part After uniformly dispersing and mixing the above materials using an attritor (manufactured by Mitsui Miike Machinery Co., Ltd.), the mixture was heated to 60° C., and 15.0 parts of behenyl stearate wax (melting point 68° C.) as an ester wax and 8.0 parts of paraffin wax (manufactured by Nippon Seiro Co., Ltd., HNP-9) as a hydrocarbon wax were added, mixed and dissolved to obtain a polymerizable monomer composition.

Preparation of Second Aqueous Medium

A total of 0.6 parts of sodium phosphate dodecahydrate was added to 166.8 parts of ion-exchanged water and heated to 60° C. while stirring using a paddle stirring blade, and then an aqueous calcium chloride solution obtained by adding 0.3 parts of calcium chloride dihydrate to 2.3 parts of ion-exchanged water was added and stirring was performed to obtain a second aqueous medium containing a dispersion stabilizer. Granulation The polymerizable monomer composition was added to the first aqueous medium, this granulation liquid was treated with CAVITRON (manufactured by Eurotec, Ltd.) for 1 h at a rotor peripheral speed of 29 m/s to achieve uniform dispersion and mixing, then 7.0 parts of t-butyl peroxypivalate was added as a polymerization initiator, and granulation was performed while stirring for 10 min at a peripheral speed of 22 m/s with CLEARMIX (manufactured by M-Technic Co., Ltd.) at 60° C. under $N_2$ atmosphere to obtain a granulation liquid containing droplets of the polymerizable monomer composition.

Polymerization/Distillation/Drying/External Addition

The granulation liquid was placed into the second aqueous medium and reacted at 74° C. for 3 h while stirring with a paddle stirring blade. After completion of the reaction, the temperature was raised to 98° C. and distillation was performed for 3 h to obtain a reaction slurry. Thereafter, as a cooling step, water of 0° C. was added to the reaction slurry, and after cooling the reaction slurry from 98° C. to 45° C. at a rate of 100° C./min, the temperature was further raised and kept at 50° C. for 3 h. After that, the system was allowed to cool to 25° C. at room temperature. The cooled reaction slurry was washed by adding hydrochloric acid, filtered and dried to obtain a toner particle having a weight-average particle diameter of 7.7 μm.

Production Example of Toner Particle 2

Production Example of Toner by Pulverization Method

Binder resin 100.0 parts (Styrene/n-butyl acrylate copolymer (styrene acrylic resin with a mass ratio of styrene and n-butyl acrylate of 78:22; Mw=8500, Tg=58° C.)

Magnetic body 2 80.0 parts

Hydrocarbon wax 5.0 parts (Fischer-Tropsch wax, melting point 77° C.)

Charge control agent 1.0 part (T-77: manufactured by Hodogaya Chemical Industry Co., Ltd.)

Sulfonic acid group-containing resin 1.0 part

After pre-mixing the above materials with an FM mixer (manufactured by Nippon Coke Industry Co., Ltd.), kneading was performed with a twin-screw kneading extruder (manufactured by Ikegai Iron Works Co., Ltd., PCM-30 type) set at a rotation speed of 3.33 $s^{-1}$ by adjusting the set temperature so that the temperature of the kneaded material near the outlet of the kneaded material was 120° C., and kneading was carried out. The resulting kneaded product was cooled, coarsely pulverized with a hammer mill, and then pulverized with a mechanical pulverizer (T-250, manufactured by Turbo Kogyo Co., Ltd.). The obtained finely pulverized powder was classified with a multi-division classifier using a Coanda effect. As a result, toner particle 2 having a weight-average particle diameter (D4) of 7.7 μm were obtained.

Production Examples of Toner Particles 3 to 5 Binder resins to be used for toner particles 3 to 5 were obtained by mixing a polyethylene naphthalate resin (TN8050SC, manufactured by Teijin Limited) at a ratio of 10% by mass, 50% by mass, and 100% by mass, respectively, as the binder resin in addition to (or in place of) the styrene/n-butyl acrylate copolymer. Toner particles 3 to 5 were obtained in the same manner as in the production example of toner particle 2, except that the obtained binder resins were used.

Production Example of Toner 1

Using an FM mixer ("FM-10B", manufactured by Nippon Coke Industry Co., Ltd.) at a rotation speed of 3200 rpm, 100 parts of toner particle 1, 0.6 parts of silica fine particle 1, and 1.00 part of strontium titanate fine particle (number-average particle diameter: 1.2 μm) were loaded and mixed for 180 sec to obtain a toner mixture. After that, coarse particles were removed using a sieve of 300 mesh (48 μm opening) to obtain a toner 1.

Production Examples of Toners 2 to 27

Toners 2 to 27 were obtained by performing the same operation as in the production example of toner 1, except that the type of toner particles, the type of silica fine particles, the number of added parts of silica fine particles, and the number of added parts of strontium titanate fine particles were changed as shown in Table 2.

Example 1

The toner 1 was evaluated as follows.

For the evaluation, HP LaserJet Enterprise M609dn was used after modifying the process speed thereof to 410 mm/sec. In addition, Vitality (manufactured by Xerox, basis weight 75 g/$cm^2$, letter size) was used as the evaluation paper.

Evaluation of Charge Retention Property

The image reproduction tester and the toner cartridge filled with the evaluation toner were allowed to stand for 1 day or more in a high-temperature and low-humidity environment of 30° C./15% RH, and then 1000 sheets with horizontal line patterns in which 4-dot horizontal lines were printed with a 176-dots spacing were printed with the image reproduction tester. After that, the tester and cartridge were allowed to stand in the same environment for 72 h, and 100 sheets were printed. After printing 1000 sheets after allowing to stand for 72 h, and after printing 100 sheets after allowing to stand for 72 h, the charge quantity (μC/g) of the toner on the developer carrying member in the toner cartridge was measured using a blow-off powder charge quantity measuring device TB-200 (manufactured by Toshiba Chemical Co., Ltd.), and the charge retention property in a high-temperature and low-humidity environment was evaluated. The smaller the rate of decrease in the charge quantity after allowing to stand for 72 h, the better the charge retention property of the toner. The evaluation was performed by determining the following evaluation criteria for the charge retention property. In addition, the evaluation was similarly made in a normal-temperature and normal-humidity environment (25° C./50% RH).

Evaluation Criteria

Charge Retention Property (Charge quantity after allowing to stand for 72 h)/(Charge quantity after printing 1000 sheets)×100

A: 90% or more.
B: 85% or more and less than 90%.
C: 80% or more and less than 85%.
D: 75% or more and less than 80%.
E: less than 75%.

Evaluation of Ghosting

The image shown in the FIGURE was output using the image reproduction tester and the toner cartridge filled with evaluation toner. The image in the FIGURE enables strict evaluation of ghost characteristic depending on the superiority or inferiority of the rising characteristic of the toner. Specifically, when ghosting occurs, the density of the half-tone portion is disturbed after the upper black band is output. The ghosting was evaluated based on whether the disturbance could be visually confirmed.

Evaluation Criteria

A: No trace of ghosting is observed.
B: The gradation corresponding to the black band is seen lightly in the upper ⅓ region of the image.
C: The gradation corresponding to the black band is seen lightly in the upper half area of the image.
D: The gradation corresponding to the black band is seen lightly over the entire area of the image.
E: The gradation corresponding to the black band is clearly observed.

Examples 2 to 19

Evaluation was performed in the same manner as in Example 1, except that toners 2 to 19 were used.

Comparative Examples 1 to 8

Evaluation was performed in the same manner as in Example 1 except that toners 20 to 27 were used.

TABLE 1

| Silica fine particle No. | Base BET/ $m^2/g$ | First treatment component: Treatment agent | First treatment component: Use amount/ kPa | First treatment component: Reaction time/ h | Second treatment component: R1 group structure | Second treatment component: R2 group structure | Second treatment component: m | Second treatment component: Number of parts for treatment | Tratment temper- ature | Sn | D1/D | DSB × $10^{-4}$ | DSB-W × $10^{-4}$ | C amount in iter- mediate | C amount in final product/ % | C amount immobili- zation rate/ % | Number- average particle diameter/ nm | X/Y |
|---|---|---|---|---|---|---|---|---|---|---|---|---|---|---|---|---|---|---|
| 1 | 200 50 (10:1) | Octamethyltetrasiloxane | 200 | 1 | Methyl group | Methyl group | 101 | 10 | 330° C. | 0.15 | 0.20 | 15 | 10 | 2.1 | 4.9 | 63 | 18 | 0.75 |
| 2 | 200 50 (10:1) | Octamethyltetrasiloxane | 200 | 3 | Methyl group | Methyl group | 101 | 10 | 330° C. | 0.05 | 0.27 | 17 | 10 | 2.4 | 4.8 | 60 | 19 | 1.00 |
| 3 | 200 50 (10:1) | Octamethyltetrasiloxane | 200 | 2 | Methyl group | Methyl group | 101 | 13 | 330° C. | 0.05 | 0.17 | 21 | 12 | 2.3 | 5.7 | 57 | 20 | 0.68 |
| 4 | 200 50 (10:1) | Octamethyltetrasiloxane | 200 | 1 | Methyl group | Methyl group | 101 | 8 | 330° C | 0.19 | 0.27 | 9.4 | 6.1 | 2.1 | 4.1 | 65 | 17 | 1.05 |
| 5 | 200 50 (10:1) | Octamethyltetrasiloxane | 200 | 2 | Methyl group | Methyl group | 101 | 8 | 330° C. | 0.16 | 0.30 | 12 | 7.9 | 2.3 | 4.3 | 64 | 18 | 1.15 |
| 6 | 200 50 (10:1) | Octamethyltetrasiloxane | 200 | 1 | Methyl group | Methyl group | 101 | 12 | 330° C. | 0.13 | 0.11 | 20 | 12 | 2.1 | 5.5 | 60 | 19 | 0.62 |
| 7 | 200 50 (6:1) | Octamethyltetrasiloxane | 200 | 1 | Methyl group | Methyl group | 101 | 10 | 330° C. | 0.14 | 0.19 | 14 | 8.6 | 2.0 | 4.5 | 60 | 21 | 0.80 |
| 8 | 200 | Octamethyltetrasiloxane | 200 | 1 | Methyl group | Methyl group | 101 | 10 | 330° C. | 0.15 | 0.20 | 15 | 9.3 | 2.2 | 4.9 | 64 | 16 | 0.81 |
| 9 | 200 | Octamethyltetrasiloxane | 200 | 1 | Carbinol group | Carbinol group | 93 | 10 | 330° C. | 0.16 | 0.18 | 15 | 10 | 2.2 | 5.1 | 66 | 17 | 0.76 |
| 10 | 30 | Octamethyltetrasiloxane | 200 | 1 | Carbinol group | Carbinol group | 93 | 9 | 330° C. | 0.17 | 0.25 | 54 | 33 | 0.7 | 1.5 | 61 | 40 | 0.88 |
| 11 | 380 | Octamethyltetrasiloxane | 200 | 1 | Carbinol group | Carbinol group | 93 | 11 | 330° C. | 0.15 | 0.15 | 10 | 6.8 | 2.4 | 6.0 | 68 | 6 | 0.67 |
| 12 | 380 | Octamethyltetrasiloxane | 200 | 1 | Carbinol group | Carbinol group | 93 | 10 | 330° C. | 0.17 | 0.20 | 8.9 | 6.5 | 2.4 | 5.7 | 73 | 5 | 0.73 |
| 13 | 300 | Octamethyltetrasiloxane | 240 | 1 | Carbinol group | Carbinol group | 93 | 5 | 330° C. | 0.19 | 0.19 | 5.7 | 4.9 | 3.2 | 4.5 | 85 | 10 | 2.46 |
| 14 | 30 | Octamethyltetrasiloxane | 240 | 1 | Carbinol group | Carbinol group | 60 | 3 | 330° C. | 0.17 | 0.25 | 56 | 56 | 3.3 | 4.0 | 100 | 41 | 4.71 |
| 15 | 380 | Octamethyltetrasiloxane | 240 | 1 | Carbinol group | Carbinol group | 93 | 10 | 330° C. | 0.17 | 0.20 | 5.7 | 1.7 | 2.4 | 5.7 | 30 | 6 | 0.73 |
| 16 | 200 | Octamethyltetrasiloxane | 100 | 1 | Methyl group | Methyl group | 101 | 15 | 290° C. | 0.25 | 0.28 | 20 | 10 | 1.9 | 6.2 | 48 | 17 | 0.44 |
| 17 | 200 | Octamethyltetrasiloxane | 100 | 1 | — | — | — | 0 | 250° C. | 0.38 | 0.40 | 5.6 | 4.5 | — | 1.7 | 80 | 14 | — |
| 18 | 200 | — | — | — | Methyl group | Methyl group | 101 | 30 | 250° C. | 0.35 | 0.28 | 29 | 19 | — | 7.2 | 65 | 19 | — |
| 19 | 200 | — | — | — | Methyl group | Methyl group | 101 | 20 | 250° C. | 0.40 | 0.28 | 23 | 16 | — | 6.0 | 70 | 17 | — |
| 20 | 200 | — | — | — | Methyl group | Methyl group | 101 | 30 | 330° C. | 0.20 | 0.25 | 60 | 47 | — | 7.3 | 79 | 22 | — |
| 21 | 200 | Hexamethyldisilazane | 25 | 1 | Methyl group | Methyl group | 101 | 10 | 250° C. | 0.10 | 0.00 | 14 | 7.2 | 2.7 | 5.1 | 53 | 17 | — |
| 22 | 200 | Hexamethyldisilazane | 25 | 1 | — | — | — | 0 | 250° C. | 0.10 | 0.00 | 0 | 0 | — | 2.7 | 95 | 14 | — |

In the table, for the silica fine particles 1 to 7, it is indicated in the "Base BET/$m^2$/g" column that small particle diameter silica having a BET specific surface area of 200 $m^2$/g and large particle diameter silica having a BET specific surface area of 50 $m^2$/g are used at a small particle diameter silica: large particle diameter silica mass ratio of 10:1 (6:1 for the silica fine particle 7). Regarding the use amount, the example using hexamethyldisilazane indicates the number of parts.

In the table. "Observed" is indicated in the "Formula (1)" column when fragment ions corresponding to the structure represented by Formula (1) are observed in TOF-SIMS measurements. "Present" is indicated in the "Vinyl resin" column when the vinyl resin having the structure represented by Formula (9) is present on the surface of the toner particle. The toner particle diameter is the weight-average particle diameter (D4). The amount of silica is the content of the silica fine particle, and the amount of TiSr is the content of the strontium titanate fine particle. These amounts indicate the number of parts by mass per 100 parts by mass of the toner particle.

TABLE 2

| Example No. | Toner No. | Silica fine particle No. | Toner particle No. | Formula (1) | Vinyl resin | Toner particle diameter/ μm | Sa | Ssi | Sa/ Ssi | Silica amount | TiSr amount | Si/Sr ratio |
|---|---|---|---|---|---|---|---|---|---|---|---|---|
| 1 | 1 | Silica fine particle 1 | Toner particle 1 | Observed | Present | 7.7 | 95% | 45% | 2.11 | 0.6 | 1.00 | 0.6 |
| 2 | 2 | Silica fine particle 1 | Toner particle 2 | Observed | Present | 7.7 | 98% | 45% | 2.18 | 0.6 | 1.00 | 0.6 |
| 3 | 3 | Silica fine particle 1 | Toner particle 2 | Observed | Present | 7.7 | 99% | 45% | 2.20 | 0.6 | 1.00 | 0.6 |
| 4 | 4 | Silica fine particle 2 | Toner particle 2 | Observed | Present | 7.7 | 100% | 45% | 2.22 | 0.6 | 1.00 | 0.6 |
| 5 | 5 | Silica fine particle 3 | Toner particle 2 | Observed | Present | 7.7 | 100% | 45% | 2.22 | 0.6 | 1.00 | 0.6 |
| 6 | 6 | Silica fine particle 4 | Toner particle 2 | Observed | Present | 7.7 | 100% | 45% | 2.22 | 0.6 | 1.00 | 0.6 |
| 7 | 7 | Silica fine particle 5 | Toner particle 2 | Observed | Present | 7.7 | 100% | 45% | 2.22 | 0.6 | 1.00 | 0.6 |
| 8 | 8 | Silica fine particle 6 | Toner particle 2 | Observed | Present | 7.7 | 100% | 45% | 2.22 | 0.6 | 1.00 | 0.6 |
| 9 | 9 | Silica fine particle 7 | Toner particle 2 | Observed | Present | 7.7 | 100% | 45% | 2.22 | 0.6 | 1.00 | 0.6 |
| 10 | 10 | Silica fine particle 8 | Toner particle 2 | Observed | Present | 7.7 | 100% | 45% | 2.22 | 0.6 | 1.00 | 0.6 |
| 11 | 11 | Silica fine particle 9 | Toner particle 2 | Observed | Present | 7.7 | 100% | 45% | 2.22 | 0.6 | 1.00 | 0.6 |
| 12 | 12 | Silica fine particle 10 | Toner particle 2 | Observed | Present | 7.7 | 100% | 35% | 2.86 | 0.6 | 1.00 | 0.6 |
| 13 | 13 | Silica fine particle 11 | Toner particle 2 | Observed | Present | 7.7 | 100% | 53% | 1.89 | 0.6 | 1.00 | 0.6 |
| 14 | 14 | Silica fine particle 12 | Toner particle 2 | Observed | Present | 7.7 | 100% | 53% | 1.89 | 0.6 | 1.00 | 0.6 |
| 15 | 15 | Silica fine particle 12 | Toner particle 3 | Observed | Present | 7.7 | 90% | 69% | 1.30 | 2.2 | 1.00 | 2.2 |
| 16 | 16 | Silica fine particle 12 | Toner particle 4 | Observed | Present | 7.7 | 50% | 25% | 2.00 | 0.2 | 1.00 | 0.2 |
| 17 | 17 | Silica fine particle 13 | Toner particle 4 | Observed | Present | 7.7 | 50% | 25% | 2.00 | 0.2 | 1.00 | 0.2 |
| 18 | 18 | Silica fine particle 14 | Toner particle 4 | Observed | Present | 7.7 | 50% | 25% | 2.00 | 0.2 | 1.00 | 0.2 |
| 19 | 19 | Silica fine particle 15 | Toner particle 4 | Observed | Present | 7.7 | 50% | 25% | 2.00 | 0.2 | 1.00 | 0.2 |
| Comparative Example 1 | 20 | Silica fine particle 1 | Toner particle 5 | Observed | — | 9.3 | 0% | 80% | 0.00 | 2.5 | 1.00 | 2.5 |
| Comparative Example 2 | 21 | Silica fine particle 16 | Toner particle 4 | Observed | Present | 7.7 | 50% | 80% | 0.63 | 2.5 | 0.00 | — |
| Comparative Example 3 | 22 | Silica fine particle 17 | Toner particle 4 | Observed | Present | 7.7 | 50% | 80% | 0.63 | 2.5 | 0.00 | — |
| Comparative Example 4 | 23 | Silica fine particle 18 | Toner particle 4 | Observed | Present | 7.7 | 50% | 80% | 0.63 | 2.5 | 0.00 | — |
| Comparative Example 5 | 24 | Silica fine particle 19 | Toner particle 4 | Observed | Present | 7.7 | 50% | 80% | 0.63 | 2.5 | 0.00 | — |
| Comparative Example 6 | 25 | Silica fine particle 20 | Toner particle 4 | Observed | Present | 7.7 | 50% | 80% | 0.63 | 2.5 | 0.00 | — |
| Comparative Example 7 | 26 | Silica fine particle 21 | Toner particle 4 | Observed | Present | 7.7 | 50% | 80% | 0.63 | 2.5 | 0.00 | — |
| Comparative Example 8 | 27 | Silica fine particle 22 | Toner particle 4 | Observed | Present | 7.7 | 50% | 80% | 0.63 | 2.5 | 0.00 | — |

TABLE 3

| | Charging performance at normal temperature and normal humidity | Ghosting at normal temperature and normal humidity | Charging performance at low humidity | Ghosting at low humidity |
|---|---|---|---|---|
| Example 1 | A | A | A | A |
| Example 2 | A | A | A | A |
| Example 3 | A | A | A | A |
| Example 4 | B | B | A | A |
| Example 5 | B | B | A | A |
| Example 6 | A | A | B | B |
| Example 7 | A | A | B | B |
| Example 8 | B | B | A | A |
| Example 9 | A | A | B | B |
| Example 10 | B | B | C | C |
| Example 11 | C | C | C | C |
| Example 12 | C | D | C | C |
| Example 13 | C | B | C | D |
| Example 14 | C | B | C | D |
| Example 15 | C | C | C | D |
| Example 16 | D | C | C | D |
| Example 17 | D | C | C | D |
| Example 18 | D | D | C | D |
| Example 19 | D | C | C | D |
| Comparative Example 1 | D | D | E | E |
| Comparative Example 2 | D | D | E | E |
| Comparative Example 3 | D | D | E | E |
| Comparative Example 4 | D | D | E | E |
| Comparative Example 5 | D | D | E | E |
| Comparative Example 6 | D | D | E | E |
| Comparative Example 7 | E | E | E | E |
| Comparative Example 8 | E | E | E | E |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075104, filed Apr. 28, 2022, which is hereby incorporated by reference herein in its entirety.

What is claimed is:

1. A toner comprising:

a toner particle; and a silica fine particle on a surface of the toner particle, wherein fragment ions corresponding to a structure represented by Formula (1) are observed in a time-of-flight secondary ion mass spectrometry measurement of the silica fine particle, (1)

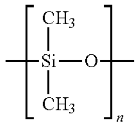

in Formula (1), n represents an integer of 1 or more, where 2.00 g of the silica fine particle is dispersed in a mixed liquid of 25.0 g of ethanol and 75.0 g of a 20 mass % NaCl aqueous solution and a titration operation using a sodium hydroxide (NaOH) solution is performed, Sn defined as Formula (10) satisfies Formula (2), $$0.05 \leq Sn \leq 0.20 \quad (2)$$

$$Sn = \{(a-b) \times c \times NA\}/(d \times e) \quad (10)$$

in Formula (10), a is a NaOH titer (L) of the NaOH solution required to adjust to 9.0 a pH of the mixed liquid in which the silica fine particle has been dispersed, b is a NaOH titer (L) of the NaOH solution required to adjust to 9.0 the pH of the mixed liquid of 25.0 g of ethanol and 75.0 g of a 20 mass % aqueous solution of NaCl without the silica fine particle having been dispersed, c is the concentration (mol/L) of the NaOH solution, NA is Avogadro's number, d is the mass (g) of the silica fine particle, and e is a BET specific surface area ($nm^2/g$) of the silica fine particle, in a chemical shift obtained by solid-state $^{29}$Si-NMR DD/MAS of the silica fine particle, with D denoting an area of a peak having a peak top present in a range from −25 to −15 ppm, S denoting the sum total of areas of peaks of an M unit, a D unit, a T unit and a Q unit present in a range from −140 to 100 ppm, and B ($m^2/g$) denoting a specific surface area of the silica fine particle, $$\text{the M unit is } (R_i)(R_j)(R_k)SiO_{1/2} \quad \text{Formula (4),}$$

$$\text{the D unit is } (R_g)(R_h)Si(O_{1/2})_2 \quad \text{Formula (5),}$$

$$\text{the T unit is } R_mSi(O_{1/2})_3 \quad \text{Formula (6),}$$

$$\text{the Q unit is } Si(O_{1/2})_4 \quad \text{Formula (7),}$$

$R_i$, $R_j$, $R_k$, $R_g$, $R_h$, and $R_m$ in Formulas (4)-(6) are each an alkyl group, a halogen atom, a hydroxy group, an acetoxy group, or an alkoxy group, a value (D/S)/B of a ratio of (D/S) relative to B is $5.7 \times 10^{-4}$ to $56 \times 10^{-4}$;

(D/S)/B measured after washing of the silica fine particle with chloroform is $1.7 \times 10^{-4}$ to $56 \times 10^{-4}$;

with D1 as an area of a peak having a peak top present in a range of more than −19 ppm and −17 ppm or less, in the chemical shift, a value (D1/D) of a ratio of D1 relative to D is 0.10 to 0.30; and a vinyl-based resin having a structure represented by Formula (9) is present on the surface of the toner particle, (9)

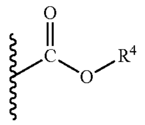

in Formula (9), $R^4$ is a hydrocarbon group having 1 to 10 carbon atoms.

2. The toner according to claim 1, wherein an abundance ratio of the structure represented by Formula (9) on the surface of the toner particle is denoted by Sa (area %), the Sa is 50 area % or more.

3. The toner according to claim 1, wherein a primary particle of the silica fine particle has a number-average particle diameter of 5 to 50 nm.

4. The toner according to claim 1, wherein a coverage of the surface of the toner particle by the silica fine particle that is calculated from an image of the toner surface observed by a scanning electron microscope is denoted by Ssi (area %), the Ssi is 30 to 100 area %.

5. The toner according to claim 1, wherein an abundance ratio of the structure represented by Formula (9) on the surface of the toner particle is denoted by Sa (area %), and a coverage of the surface of the toner particle by the silica fine particle that is calculated from an image of the toner surface observed by a scanning electron microscope is denoted by Ssi (area %), a value (Sa/Ssi) of the ratio of the Sa to the Ssi is 0.25 to 3.00.

6. The toner according to claim 1, wherein the silica fine particle is surface-treated with at least a compound represented by Formula (3)

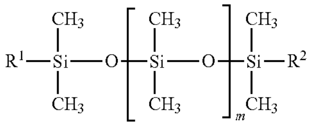

(3)

in Formula (3), $R^1$ and $R^2$ each independently represent a carbinol group, a hydroxy group, an epoxy group, a carboxy group, an alkyl group, or a hydrogen atom, and m is the average number of repeating units and is an integer of from 1 to 200.

7. The toner according to claim 1, wherein a carbon amount immobilization rate when the silica fine particle is washed with chloroform is 30 to 70%, and wherein the carbon amount immobilization rate (%) is (carbon amount in silica fine particle treated with chloroform)/(carbon amount in silica fine particle before washing with chloroform)×100.

8. The toner according to claim 1, further comprising a strontium titanate fine particle on the surface of the toner particle.

9. The toner according to claim 1, wherein the silica fine particle is a silicone-oil-treated product of a silica fine particle treated with a cyclic siloxane.

* * * * *